United States Patent
Shailesh

(10) Patent No.: US 11,808,905 B2
(45) Date of Patent: Nov. 7, 2023

(54) SUBSURFACE GEOPHYSICAL DATA SYSTEM

(71) Applicant: Schlumberger Technology Corporation, Sugar Land, TX (US)

(72) Inventor: Shankar Shailesh, Pune (IN)

(73) Assignee: Schlumberger Technology Corporation, Sugar Land, TX (US)

( * ) Notice: Subject to any disclaimer, the term of this patent is extended or adjusted under 35 U.S.C. 154(b) by 485 days.

(21) Appl. No.: 17/247,544

(22) Filed: Dec. 16, 2020

(65) Prior Publication Data
US 2021/0223426 A1 Jul. 22, 2021

(30) Foreign Application Priority Data
Dec. 17, 2019 (IN) .............. 201921052463

(51) Int. Cl.
G01V 1/30 (2006.01)
H04L 9/06 (2006.01)
H04L 9/08 (2006.01)
H04L 9/32 (2006.01)

(52) U.S. Cl.
CPC ............ *G01V 1/306* (2013.01); *H04L 9/0643* (2013.01); *H04L 9/085* (2013.01); *H04L 9/3221* (2013.01); *H04L 9/3247* (2013.01)

(58) Field of Classification Search
CPC .......... G01V 1/306; G01V 1/34; G01V 99/00; H04L 9/0643; H04L 9/085; H04L 9/3221; H04L 9/3247; H04L 9/0872; H04L 9/3239; H04L 9/50
See application file for complete search history.

(56) References Cited

U.S. PATENT DOCUMENTS

2020/0379977 A1* 12/2020 Saket .................... H04L 9/3239

OTHER PUBLICATIONS

Vaidya et al., Authentication and Authorization Mechanisms for Substation Automation in Smart Grid Network, Jan./Feb. 2013, IEEE Network, pp. 5-11 (Year: 2013).*
Chatzigiannakis, I. et al., "Elliptic Curve Based Zero Knowledge Proofs and Their Applicability on Resource Constrained Devices", MASS '11 Proceedings of the 2011 IEEE Eighth International Conference on Mobile Ad-Hoc and Sensor Systems, Oct. 17-22, 2011, 13 pages.
"Zero-knowledge proof" accessed on Dec. 3, 2020 at [https://en.wikipedia.org/wiki/Zero-knowledge_proof], last edited Dec. 3, 2020, 12 pages.
Andrew Miller, "Lecture 7—Zero Knowledge Proofs," ECE/CS 598AM: Cryptocurrency Security, Fall 2016, 4 pages.

* cited by examiner

*Primary Examiner* — Toan M Le
(74) *Attorney, Agent, or Firm* — Jeffrey D. Frantz

(57) ABSTRACT

A method can include receiving a request from a requester for subsurface geophysical data of a geologic environment; responsive to the request, authenticating the requester using a zero-knowledge authentication scheme; and, responsive to authentication of the requester, providing access to at least a portion of the subsurface geophysical data of the geologic environment.

20 Claims, 12 Drawing Sheets

System 700

Method 780

GUI 1010

GUI 1030

SUBSURFACE GEOPHYSICAL DATA SYSTEM

This application claims the benefit of India Patent Application No. 201921052463 filed on Dec. 17, 2019, and is hereby incorporated by reference in its entirety.

BACKGROUND

Drilling equipment may be utilized to drill into rock of a geologic region, for example, to form a borehole and equipment may be utilized to form a completed well from the borehole.

SUMMARY

A method can include receiving a request from a requester for subsurface geophysical data of a geologic environment; responsive to the request, authenticating the requester using a zero-knowledge authentication scheme; and, responsive to authentication of the requester, providing access to at least a portion of the subsurface geophysical data of the geologic environment. A system can include a processor; memory accessible to the processor; processor-executable instructions stored in the memory and executable by the processor to instruct the system to: receive a request from a requester for subsurface geophysical data of a geologic environment; responsive to the request, authenticate the requester using a zero-knowledge authentication scheme; and, responsive to authentication of the requester, provide access to at least a portion of the subsurface geophysical data of the geologic environment. One or more computer-readable storage media can include computer-executable instructions executable to instruct a computing system to: receive a request from a requester for subsurface geophysical data of a geologic environment; responsive to the request, authenticate the requester using a zero-knowledge authentication scheme; and, responsive to authentication of the requester, provide access to at least a portion of the subsurface geophysical data of the geologic environment.

Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

The following description includes embodiments of the best mode presently contemplated for practicing the described implementations. This description is not to be taken in a limiting sense, but rather is made merely for the purpose of describing the general principles of the implementations. The scope of the described implementations should be ascertained with reference to the issued claims.

Various operations can be performed in a field. For example, consider exploration as an initial phase in petroleum operations. In an exploration phase, one or more surveys may be performed using field equipment. For example, consider a seismic survey that utilizes sources and receivers where sources can emit seismic energy and where receivers can receive emitted seismic energy where such seismic energy can provide indications of subsurface structures in the Earth. A seismic survey may be a land survey or a marine survey. A seismic survey can generate a relatively large amount, which may be stored in a particular format, for example, on one or more servers. As an example, an exploration phase can include drilling such as drilling of an exploration well or borehole and acquiring data via one or more downhole tools (e.g., drillstring tools, wireline tools, etc.). An exploration phase can aim to generate a prospect or play. Appraisal, development and production phases may follow successful exploration. Such additional phases can also generate data, which may be utilized for purposes of decision making, performing operations, controlling equipment, etc.

Figure 1:
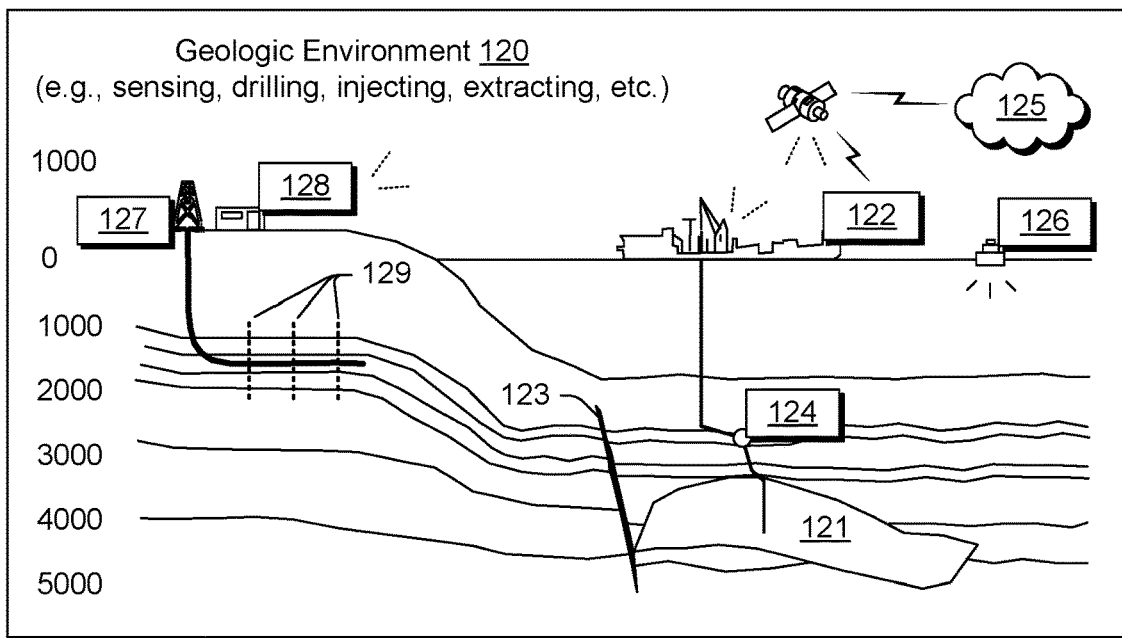
FIG. 1 illustrates examples of equipment in a geologic environment.
Figure 1:
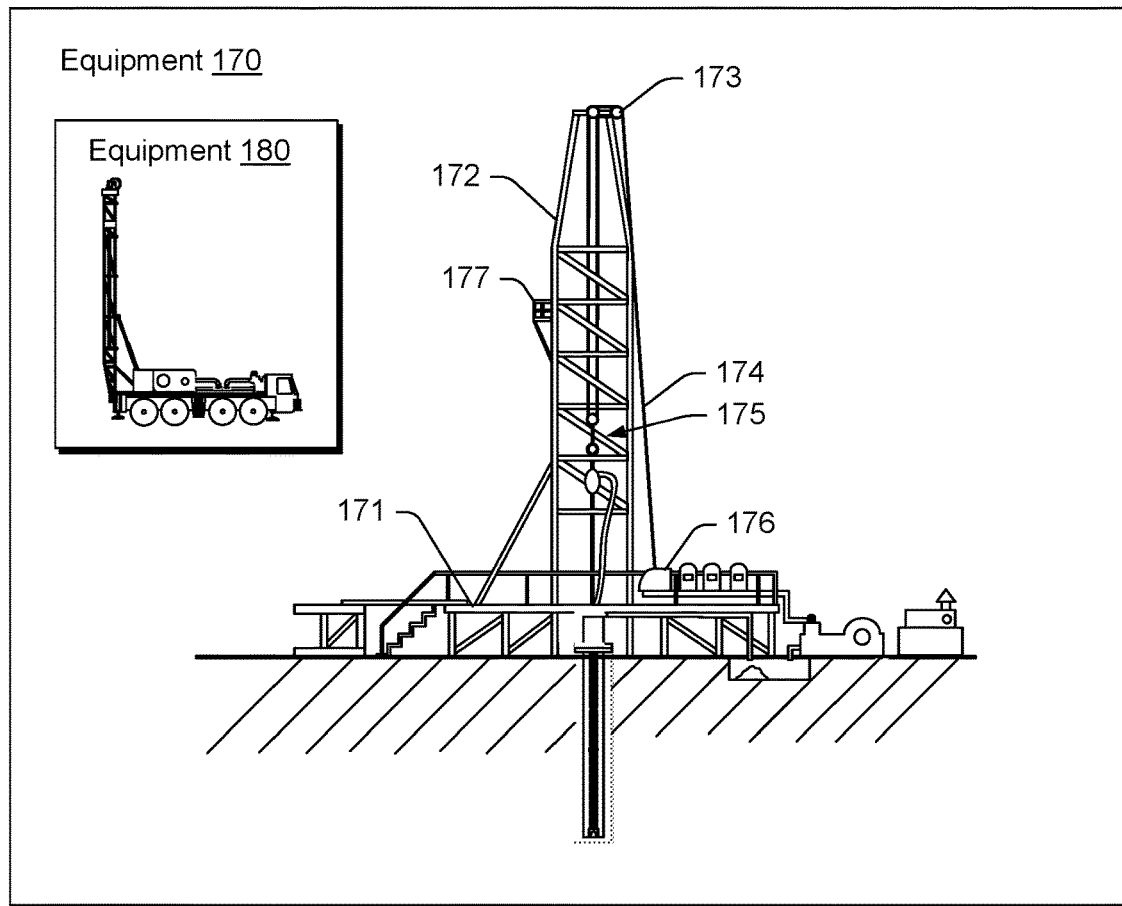

FIG. 1 shows an example of a geologic environment 120. In FIG. 1, the geologic environment 120 may be a sedimentary basin that includes layers (e.g., stratification) that include a reservoir 121 and that may be, for example, intersected by a fault 123 (e.g., or faults). As an example, the geologic environment 120 may be outfitted with a variety of sensors, detectors, actuators, etc. For example, equipment 122 may include communication circuitry to receive and/or to transmit information with respect to one or more networks 125. Such information may include information associated with downhole equipment 124, which may be equipment to acquire information, to assist with resource recovery, etc. Other equipment 126 may be located remote from a well site and include sensing, detecting, emitting or other circuitry. Such equipment may include storage and communication circuitry to store and to communicate data, instructions, etc. As an example, one or more pieces of equipment may provide for measurement, collection, communication, storage, analysis, etc. of data (e.g., for one or more produced resources, etc.). As an example, one or more satellites may be provided for purposes of communications, data acquisition, geolocation, etc. For example, FIG. 1 shows a satellite in communication with the network 125 that may be configured for communications, noting that the satellite may additionally or alternatively include circuitry for imagery (e.g., spatial, spectral, temporal, radiometric, etc.).

FIG. 1 also shows the geologic environment 120 as optionally including equipment 127 and 128 associated with a well that includes a substantially horizontal portion that may intersect with one or more fractures 129. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop the reservoir (e.g., via fracturing, injecting, extracting, etc.). As an example, the equipment 127 and/or 128 may include components, a system, systems, etc., for fracturing, seismic sensing, analysis of seismic data, NMR logging, assessment of one or more fractures, injection, production, etc. As an example, the equipment 127 and/or 128 may provide for measurement, collection, communication, storage, analysis, etc. of data such as, for example, formation data, fluid data, production data (e.g., for one or more produced resources), etc.

As an example, seismic data may be acquired and analyzed to understand better subsurface structure of a geologic environment. Reflection seismology finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz or optionally less than about 1 Hz and/or optionally more than about 100 Hz). Seismic data may be processed and interpreted, for example, to understand better composition, fluid content, extent and geometry of subsurface rocks.

One or more types of acquisition techniques may be utilized to acquire seismic data where a computational framework may process data acquired, for example, to allow for direct or indirect management of sensing, drilling, injecting, extracting, etc., with respect to a geologic environment.

An acquisition technique for seismic data can utilize acquisition equipment that can emit energy from a source (e.g., a transmitter) and receive reflected energy via one or more sensors (e.g., receivers). As a region can include layers, energy emitted by a transmitter of the acquisition equipment can reflect off the layers. Evidence of such reflections may be found in the acquired traces. A trace, energy received may be discretized by an analog-to-digital converter that operates at a sampling rate. For example, acquisition equipment may convert energy signals sensed by a sensor to digital samples at a rate of one sample per approximately 4 ms. Given a speed of sound in a medium or media, a sample rate may be converted to an approximate distance. For example, the speed of sound in rock may be on the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where latter acquired samples correspond to deeper reflection boundaries. If the 4 second trace duration of the foregoing example is divided by two (e.g., to account for reflection), for a vertically aligned source and sensor, the deepest boundary depth may be estimated to be about 10 km (e.g., assuming a speed of sound of about 5 km per second).

As an example, data such as seismic data may be formatted according to one of the SEG-Y format standards (Society of Exploration Geophysicists), the ZGY format standard (e.g., a bricked format) or another format. As an example, seismic data may be stored with trace header information, which may assist in analysis of the seismic data. Seismic data may optionally be accessed, for example, according to a number of traces (e.g., in an inline, crossline or inline and crossline directions), which may be entire traces or portions thereof (e.g., for one or more particular times or depths). As an example, given a number of traces across a region, a process may access some of those traces in a sub-region by specifying inline and crossline indices (e.g., or geographic or grid coordinates) as well as a time or depth window.

In the oil and gas industry, various types of geophysical data are generated. As explained, geophysical data can be used by exploration and production personnel to ascertain the presence, nature and size of subsurface rock layers and reservoirs contained therein. Geophysics encompasses the physics of the planet.

FIG. 1 also shows an example of equipment 170 and an example of equipment 180. Such equipment, which may be systems of components, may be suitable for use in the geologic environment 120. While the equipment 170 and 180 are illustrated as land-based, various components may be suitable for use in an offshore system. As shown in FIG. 1, the equipment 180 can be mobile as carried by a vehicle; noting that the equipment 170 can be assembled, disassembled, transported and re-assembled, etc.

The equipment 170 includes a platform 171, a derrick 172, a crown block 173, a line 174, a traveling block assembly 175, drawworks 176 and a landing 177 (e.g., a monkeyboard). As an example, the line 174 may be controlled at least in part via the drawworks 176 such that the traveling block assembly 175 travels in a vertical direction with respect to the platform 171. For example, by drawing the line 174 in, the drawworks 176 may cause the line 174 to run through the crown block 173 and lift the traveling block assembly 175 skyward away from the platform 171; whereas, by allowing the line 174 out, the drawworks 176 may cause the line 174 to run through the crown block 173 and lower the traveling block assembly 175 toward the platform 171. Where the traveling block assembly 175 carries pipe (e.g., casing, etc.), tracking of movement of the traveling block 175 may provide an indication as to how much pipe has been deployed.

As mentioned, a drillstring can include various tools that may make measurements. As an example, a wireline tool or another type of tool may be utilized to make measurements. As an example, a tool may be configured to acquire electrical borehole images. As an example, the fullbore Formation MicroImager (FMI) tool (Schlumberger Limited, Houston, Texas) can acquire borehole image data. A data acquisition sequence for such a tool can include running the tool into a borehole with acquisition pads closed, opening and pressing the pads against a wall of the borehole, delivering electrical current into the material defining the borehole while translating the tool in the borehole, and sensing current remotely, which is altered by interactions with the material.

Analysis of formation information may reveal features such as, for example, vugs, dissolution planes (e.g., dissolution along bedding planes), stress-related features, dip events, etc. As an example, a tool may acquire information that may help to characterize a reservoir, optionally a fractured reservoir where fractures may be natural and/or artificial (e.g., hydraulic fractures). As an example, information acquired by a tool or tools may be analyzed using a framework such as the TECHLOG framework. As an example, the TECHLOG framework can be interoperable with one or more other frameworks such as, for example, the PETREL framework, the DELFI framework, etc.

Figure 2:
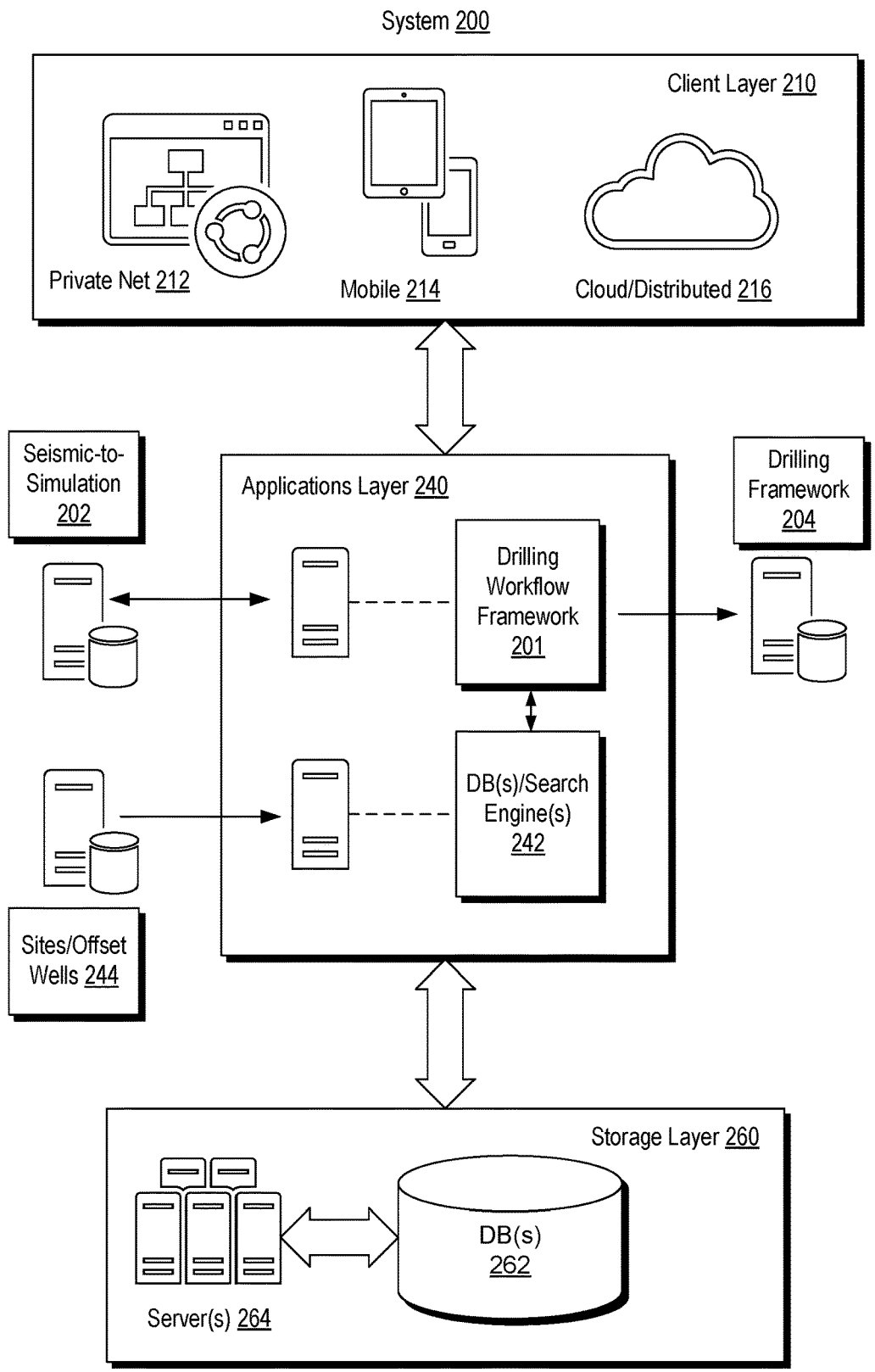
FIG. 2 illustrates an example of a system.

FIG. 2 shows an example of a system 200 that includes a drilling workflow framework 201, a seismic-to-simulation framework 202, a drilling framework 204, a client layer 210, an applications layer 240 and a storage layer 260. As shown the client layer 210 can be in communication with the applications layer 240 and the applications layer 240 can be in communication with the storage layer 260. In such an example, a computational framework may be provided for handling of logging measurements and/or data derived from logging measurements. For example, logging information may be provided to the seismic-to-simulation framework 202 and/or to the drilling framework 204. Such information may be utilized for model building (e.g., constructing a multidimensional model of a geologic environment), generating a trajectory for a well (e.g., or an extension thereof), generating a stimulation plan (e.g., fracturing, chemical treatment, etc.), controlling one or more drilling operations, etc.

In the example of FIG. 2, the client layer 210 can include features that allow for access and interactions via one or more private networks 212, one or more mobile platforms and/or mobile networks 214 and via the "cloud" 216, which may be considered to include distributed equipment that forms a network such as a network of networks.

In the example of FIG. 2, the applications layer 240 includes the drilling workflow framework 201. The applications layer 240 also includes a database management component 242 that includes one or more search engine features (e.g., sets of executable instructions to perform various actions, etc.).

As an example, the database management component 242 can include one or more search engine features that provide for searching one or more information that may be stored in one or more data repositories. As an example, the STUDIO E&P knowledge environment (Schlumberger Ltd., Houston, Texas) includes STUDIO FIND search functionality, which provides a search engine. The STUDIO FIND search functionality also provides for indexing content, for example, to create one or more indexes. As an example, search functionality may provide for access to public content, private content or both, which may exist in one or more databases, for example, optionally distributed and accessible via an intranet, the Internet or one or more other networks. As an example, a search engine may be configured to apply one or more filters from a set or sets of filters, for example, to enable users to filter out data that may not be of interest.

As an example, a framework may provide for interaction with a search engine and, for example, associated features such as features of the STUDIO FIND search functionality. As an example, a framework may provide for implementation of one or more spatial filters (e.g., based on an area viewed on a display, static data, etc.). As an example, a search may provide access to dynamic data (e.g., "live" data from one or more sources), which may be available via one or more networks (e.g., wired, wireless, etc.). As an example, one or more components may optionally be implemented within a framework or, for example, in a manner operatively coupled to a framework (e.g., as an add-on, a plug-in, etc.). As an example, a component for structuring search results (e.g., in a list, a hierarchical tree structure, etc.) may optionally be implemented within a framework or, for example, in a manner operatively coupled to a framework (e.g., as an add-on, a plug-in, etc.).

In the example of FIG. 2, the applications layer 240 can include communicating with one or more resources such as, for example, the seismic-to-simulation framework 202, the drilling framework 204 and/or one or more sites, which may be or include one or more offset wellsites. As an example, the applications layer 240 may be implemented for a particular wellsite where information can be processed as part of a workflow for operations such as, for example, operations performed, being performed and/or to be performed at the particular wellsite. As an example, an operation may involve directional drilling, for example, via geosteering. As an example, an operation may involve logging via one or more downhole tools.

In the example of FIG. 2, the storage layer 260 can include various types of data, information, etc., which may be stored in one or more databases 262. As an example, one or more servers 264 may provide for management, access, etc., to data, information, etc., stored in the one or more databases 262. As an example, the database management component 242 may provide for searching as to data, information, etc., stored in the one or more databases 262.

As an example, the database management component 242 may include features for indexing, etc. As an example, information may be indexed at least in part with respect to wellsite. For example, where the applications layer 240 is implemented to perform one or more workflows associated with a particular wellsite, data, information, etc., associated with that particular wellsite may be indexed based at least in part on the wellsite being an index parameter (e.g., a search parameter).

As an example, the system 200 of FIG. 2 may be implemented to perform one or more portions of one or more workflows associated with FIG. 1. As an example, the drilling workflow framework 201 may interact with a technical data framework (e.g., a logging data framework, etc.) and the drilling framework 204 before, during and/or after performance of one or more drilling operations. In such an example, the one or more drilling operations may be performed in a geologic environment (see, e.g., the environment 150 of FIG. 1) using one or more types of equipment.

As an example, an architecture utilized in a system such as, for example, the system 200 may include features of the AZURE architecture (Microsoft Corporation, Redmond, Washington). As an example, a cloud portal block can include one or more features of an AZURE portal that can manage, mediate, etc. access to one or more services, data, connections, networks, devices, etc. As an example, the system 200 may include features of the GOOGLE cloud architecture (Google, Mountain View, California).

As an example, the system 200 can include a cloud computing platform and infrastructure, for example, for building, deploying, and managing applications and services (e.g., through a network of datacenters, etc.). As an example, such a cloud platform may provide PaaS and IaaS services and support one or more different programming languages, tools and frameworks, etc.

Various web applications and mobile applications use secret-based authentication, for example, a login password can be utilized in single factor authentication. In some instances, multi-factor authentication is utilized. An additional factor can be a human proof, an email proof, a text message proof, a telephonic proof, etc., where a message is received (e.g., from the verifier) to challenge the prover. In such authentication schemes, knowledge is exposed, which can allow for snooping, attacks, etc.

An example of an insecurity of an exposed knowledge authentication scheme can be a man-in-the-middle (MITM)

that can see or otherwise intercept knowledge. MITM can be described as an attack where the attacker secretly relays and possibly alters the communications between two parties who believe that they are directly communicating with each other. An MITM attack can include active eavesdropping, in which the attacker makes independent connections with the victims and relays messages between them to make them believe they are talking directly to each other over a private connection, when in fact the entire conversation is controlled by the attacker. In some instances, the attacker can intercept relevant messages passing between the two victims and inject new ones.

In a password authentication scheme, where a password is transmitted (e.g., non-encrypted or encrypted), the verifier aims to match the password, for example, using a credential database. As explained, such a transmitted secret-based authentication can be subject to interception.

As an example, an authentication scheme can utilize a zero-knowledge (ZK) approach that can, for example, adhere to a zero-knowledge proof. A ZK approach can provide for authentication without exposing knowledge.

Figure 3:
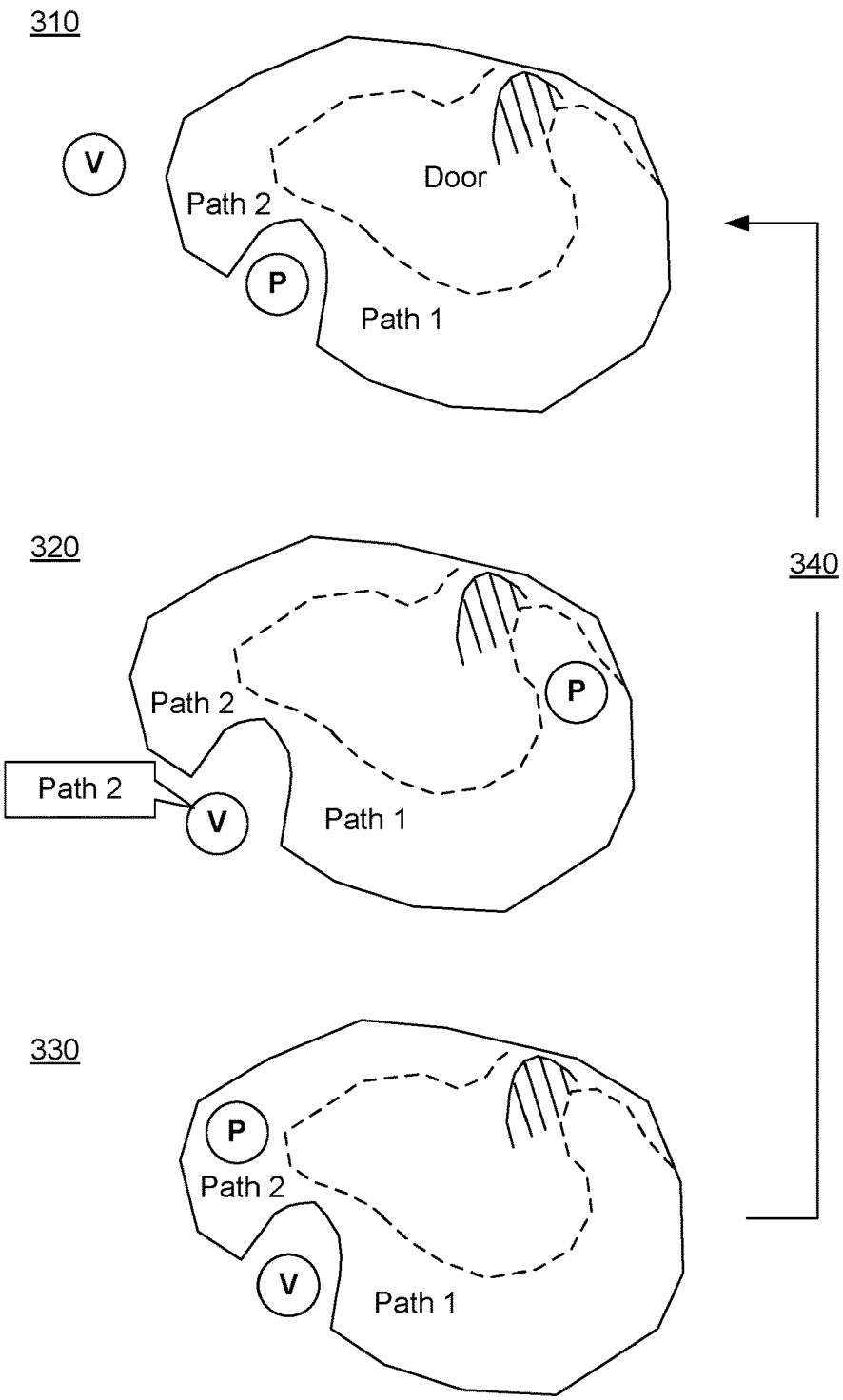
FIG. 3 illustrates an example of a method.

FIG. 3 shows an example of a method 300 that can provide for authentication with zero-knowledge. As shown, a cave includes an opening to two paths where a door is disposed between the two paths, path 1 and path 2. The door can be opened for passage between the paths 1 and 2 by a person that possess knowledge of how the door can be opened (e.g., a secret). In the example of FIG. 3, a prover P and a verifier V are shown where the prover P can verify to the verifier V that the prover P has knowledge of the secret without exposing the secret.

As shown, the paths 1 and 2 of the cave form a ring with an entrance on one side and the door blocking connection of the paths 1 and 2. As explained, V wants to know whether P knows the secret to open the door; but P does not want to reveal P's knowledge (e.g., a secret word, etc.) to V or to reveal the fact of P's knowledge to the world in general.

As shown in FIG. 3, the method 300 commences at a set-up block 310 where V waits outside the cave as P goes into the cave. P can take either path 1 or path 2 and V cannot see which path P takes. At block 320, V presents a challenge to P. As shown, V enters through the entrance of the cave and shouts the name of the path that V wants P to use to return to the entrance of the cave. V can shout out either path 1 or path 2, which is selected by V randomly. At block 330, P appears near the entrance of the cave at path 2, which proves to V that P knows the secret to open the door as P can open the door, if necessary, and returns along the path shouted out by V.

In block 330, P responds to V's challenge. However, if P did not know the secret, P could respond successfully in this one trial if P, by chance, entered the path that V selected in the challenge. As V is to choose path 1 or path 2 at random, P has a 50 percent chance of being in the chosen path. Thus, in the zero-knowledge method 300 of FIG. 3, proof is probabilistic and can increase with (i) number of trials and/or (ii) number of paths. For example, by performing 20 trials in a row, P's chance of successfully guessing V's challenge would become vanishingly small (e.g., about one in a million). Or, for example, if the number of paths were of the order of 100 or more, similarly, guessing V's challenge would be quite unlikely. In the example of FIG. 3, if additional trials are performed, as indicated by block 340, which continues to block 310, and P repeatedly appears at the path exit selected by V, V can conclude that it is extremely probable that P does in fact know the secret to the door.

As to a third-party observer, even if V is wearing a hidden camera that records the whole transaction, the camera will record in one case V shouting "path 2" and P appearing at path 2 or in another case V shouting "path 1" and P appearing at path 1. Such a recording would be trivial for two people to fake. Such a recording can be convincing to the original participants but not others. In fact, a person who was present as an observer at the original experiment would be unconvinced, since V and P might have orchestrated the trials from start to finish.

Additionally, if V's random process is exposed (e.g., recording of a coin flip for heads, path 1, and tails, path 2), the protocol loses its zero-knowledge property as the exposed random process could be convincing to a person. While exposure of the random process does not reveal the secret to V, it does make it possible for V to convince the world in general that P has the knowledge of the secret to the door, which is counter to P's stated wishes. In digital cryptography, a pseudo-random number generator can be utilized, which is akin to a coin with a fixed pattern of heads and tails known to the coin's owner. If V's coin behaved this way, then again it would be possible for V and P to have faked the trials (i.e., an observer would be unconvinced), so using a pseudo-random number generator would not reveal P's knowledge to the world in the same way using a flipped coin would.

Notice that P could prove to V that P knows the secret, without revealing it to V, in a single trial. If both V and P go together to the entrance of the cave, V can watch P go in through path 1 and come out through path 2. This would prove with certainty that P knows the secret, without revealing the secret to V. However, such a proof could be observed by a third party, or recorded by V and such a proof would be convincing to a third party. In other words, P could not refute such proof by claiming P colluded with V, and P is therefore no longer in control of who is aware of her knowledge.

The foregoing ZK method 300 is interactive as it involves interactions between P and V, which, again, are the prover and verifier. As an example, a ZK approach can be non-interactive where, for example, a prover can prove knowledge without being presented a challenge by a verifier.

Non-interactive zero-knowledge proofs are a variant of zero-knowledge proofs in which no interaction occurs between prover and verifier. For example, a common reference string shared between the prover and the verifier can be enough to achieve computational zero-knowledge without interaction. Non-interactive zero-knowledge proofs can show a separation between cryptographic tasks that can be achieved in a standard model and those that can be achieved in "more powerful" extended models.

A model can influence properties that can be obtained from a zero-knowledge protocol. For example, in a common reference string model, non-interactive zero-knowledge protocols do not preserve each of the properties of interactive zero-knowledge protocols; e.g., they do not preserve deniability.

Non-interactive zero-knowledge proofs can be obtained in the random oracle model, for example, using the Fiat-Shamir heuristic. A particular type of non-interactive approach is the zero-knowledge succinct non-interactive argument of knowledge approach (zk-SNARK), which is implemented in the ZCASH cryptocurrency scheme.

The zk-SNARK approach can allow one to prove possession of certain information (e.g. a secret key), without revealing that information, and without interaction between the prover and verifier. In other words, proof can be made that a statement is true without interaction and without revealing information beyond the validity of the statement itself. For example, given the hash of a random number, the prover could convince the verifier that there indeed exists a number with this hash value, without revealing what it is. In a ZK scheme, the prover can convince the verifier that the secret exists and that the prover knows the secret, without revealing information about the secret.

Succinct zero-knowledge proofs can be verified within a few milliseconds, with a proof length of a few hundred bytes even for statements about programs that can be very large. As explained with respect to the method 300 of FIG. 3, the prover and the verifier interact (e.g., communicate back and forth for multiple rounds). In non-interactive constructions, the proof can be a single message sent from the prover to the verifier.

An efficient way to produce zero-knowledge proofs that are non-interactive and short enough to publish to a block chain involves an initial setup phase that generates a common reference string shared between the prover and the verifier. The common reference string can be considered to be public parameters of the scheme.

As explained with respect to a coin as a random generator that could be recorded, similarly, if someone had access to the secret randomness used to generate the public parameters, that person would be able to create false proofs that would look valid to the verifier. In the context of ZCASH, this would mean that a malicious party could create counterfeit coins. To prevent this from happening, ZCASH generates the public parameters through an elaborate, multi-party ceremony that aims protect the secret randomness from being exposed (e.g. computers being blowtorched).

Again, using ZCASH as an example, in comparison to BITCOIN, in BITCOIN, transactions are validated by linking the sender address, receiver address, and input and output values on a public blockchain. In contrast, ZCASH uses zk-SNARKs to prove that the conditions for a valid transaction have been satisfied without revealing crucial information about the addresses or values involved. In ZCASH, a sender of a shielded transaction constructs a proof to show that, with high probability: (i) the input values sum to the output values for each shielded transfer; (ii) the sender proves that they have the private spending keys of the input notes, giving them the authority to spend; and (iii) the private spending keys of the input notes are cryptographically linked to a signature over the whole transaction, in such a way that the transaction cannot be modified by a party who did not know these private keys.

As explained, ZK schemes can be interactive or non-interactive. Interactive proofs may demand back-and-forth messages sent between the verifier and prover. In a non-interactive proof, the prover may generate a single message (e.g., the "proof") which the verifier can check directly.

ZK proofs satisfy properties of correctness, zero knowledge and proof of knowledge. ZK proofs are probabilistic, as explained with respect to the method 300.

As an example, one or more authentication schemes may be based at least in part on discrete logarithms. In mathematics of real numbers, the logarithm $\log_b a$ is a number x such that $b^x=a$, for given numbers a and b. Analogously, in a group G, powers $b^k$ can be defined for integers k, and the discrete logarithm $\log_b a$ is an integer k such that $b^k=a$. In number theory, the term index can be used, for example, one may write $x=\text{ind}_r a \pmod{m}$ (read the index of a to the base r modulo m) for $r^x \equiv a \pmod{m}$ if r is a primitive root of m and $\gcd(a,m)=1$ (where gcd is the greatest common divisor).

There exist groups for which computing discrete logarithms is apparently difficult. In some cases (e.g., large prime order subgroups of groups $(Zp)^x$) there tends to be no efficient algorithm known for the worst case, but the average-case complexity can be shown to be about as hard as the worst case using random self-reducibility. At the same time, the inverse problem of discrete exponentiation is not difficult (e.g., consider efficient computation using exponentiation by squaring). This asymmetry can be viewed as being analogous to the asymmetry between integer factorization and integer multiplication. One or more of such asymmetries (e.g., and other possibly one-way functions) may be utilized in the construction of cryptographic systems.

As to the choice of the group G in discrete logarithm cryptography (DLC), consider one or more of the cyclic groups (e.g., ElGamal encryption, Diffie-Hellman key exchange, and the Digital Signature Algorithm) and/or one or more of the cyclic subgroups of elliptic curves over finite fields (e.g., elliptic curve cryptography, ECC).

As an example, a group G can be a set of values referred to as a carrier set and a group Zp can be a group of integers modulo p under addition. As an example, a cyclic group, <g>, can be generated by taking an element g, which is referred to as a generator, and raising it to some power. In such an example, for a X within <g>, there exists an x within $Z_{|<g>|}$ such that $X=g^x$. As explained, given an element X within a group G it can be difficult to compute the discrete log of X, which would be the exponent x with ZIP' such that $X=g^x$.

In cryptocurrencies BITCOIN and ETHEREUM, a group known as secp256k1 elliptical curve group is utilized where elements of that group can be represented as 257-bit strings (e.g., sometimes allowing for dropping of the last bit to make a 256 bit string) and where discrete log is thought to be hard in this group.

In various examples, notation infers, as appropriate, use of the binary operation "•" (e.g., $KA^c=KA^c$, $cx=c \cdot x$, etc.). For example, there may be juxtaposition with no symbol (e.g., ab being represented as ab).

In an interactive proof, consider the prover having a generator g of a group G of prime order p where "a" is a secret, which may be referred to as a witness w (e.g., private knowledge), and where $g^a=A$; and the verifier having A (e.g., public knowledge). In such an example, the prover can sample k from a group Zp, which is the group of intergers modulo p, under addition. The prover can generate K using the generator g and k (e.g., $g^k$) and present K as a commitment to the verifier. In response to the commitment, the verifier can issue a challenge by sampling c from the group Zp. And, in response to the challenge, the prover can transmit s, where s:=k+ca. The verifier can then determine whether $g^s=KA^c$. In such an example, it is not trivial for the verifier to compute the secret "a" given A directly. In other words, the discrete log problem can be hard.

As to proof of correctness: $g^s=g^{k+ca}=g^k(g^a)^c=KA^c$.

As to proof of the knowledge property, consider c and c' as being two distinct challenges and corresponding responses s and s'. Proof can check $g^s/A^c=K=g^{s'}/A^{c'}$ and thus $g^{s-s'}=A^{c-c'}$ to demonstrate $A=g^{(s-s')/(c-c')}$.

As to proof of the zero-knowledge property, consider sampling of c from Zp and sampling of s from Zp and computing $K:=g^s/A_C$. In such a proof, s and c can be uniformly distributed in Zp, as in an honest execution. Thus, given s and c, K is uniquely determined in a valid proof.

As to non-interactive, consider a random oracle (e.g., a random oracle assumption) where the verifiers challenge is replaced with a hash of the commitment. Such an approach can utilize the Fiat-Shamir transformation, also referred to as the Fiat-Shamir heuristic. In such an approach, the set-up can be the same as in the interactive approach but the prover sends a single message (K, s), where s:=k+ca, as before, however, c is not a challenge from the verifier, rather c is a hash of K (e.g., K:=$g^k$ and c:=H(K)). In such an approach, the verifier aims to determine if $g^s$=$KA^{H(K)}$. As indicated, c is not directly transmitted from the prover to the verifier; rather, K and s are transmitted, where s:=k+ca and where c:=H(K).

As an example, a signature scheme may be utilized according to zero-knowledge proof. For example, consider a Schnorr signature scheme as a type of digital signature scheme where knowledge of a secret "a" can be used to sign a message m where possession of a public key A can be utilized to verify the signature. In such an example, the verifier can have the public key A and the message m where the hash H is utilized as follows to generate c, c:=H(K||m). In such an approach, the signer transmits K and s while the verifier determines if $g^s$=$KA^{H(K||m)}$.

As an example, a ZK scheme can involve prover P in possession of a witness w (e.g., a secret) for a public element x in a session specified by R, where h is a verifier's V's challenge. Such a scheme can satisfy (i) completeness such that, if P possess a witness w for x, then V is satisfied of the proof; (ii) soundness such that if P does not know a witness w for x, then P is able to proof its possession to V with negligible probability; and (iii) zero-knowledge such that by executing the protocol, V learns nothing but the fact that P possesses a witness w for x.

As an example, a ZK scheme can include a set-up and a protocol (e.g., consider a Sigma-protocol, etc.). For example, consider sampling of a key pair (w, x) where in a set-up, x (e.g., a public key) is communicated to a verifier V while a prover P possesses w (e.g., a private key). A protocol can include three transmissions: R as a unique session identifier; h as an unforeseeable challenge to P from V; and s as the proof of knowledge in the session R for the challenge h. In such a scheme, h is the protection for V that P cannot cheat and in the light of special soundness, R is the protection for P that nobody can retrieve the secret w. In such notation, the session specified by R can be the aforementioned commitment K and the challenge h can be the aforementioned challenge c; whereas, s remains the response to the challenge (e.g., challenge h or c).

Figure 4:
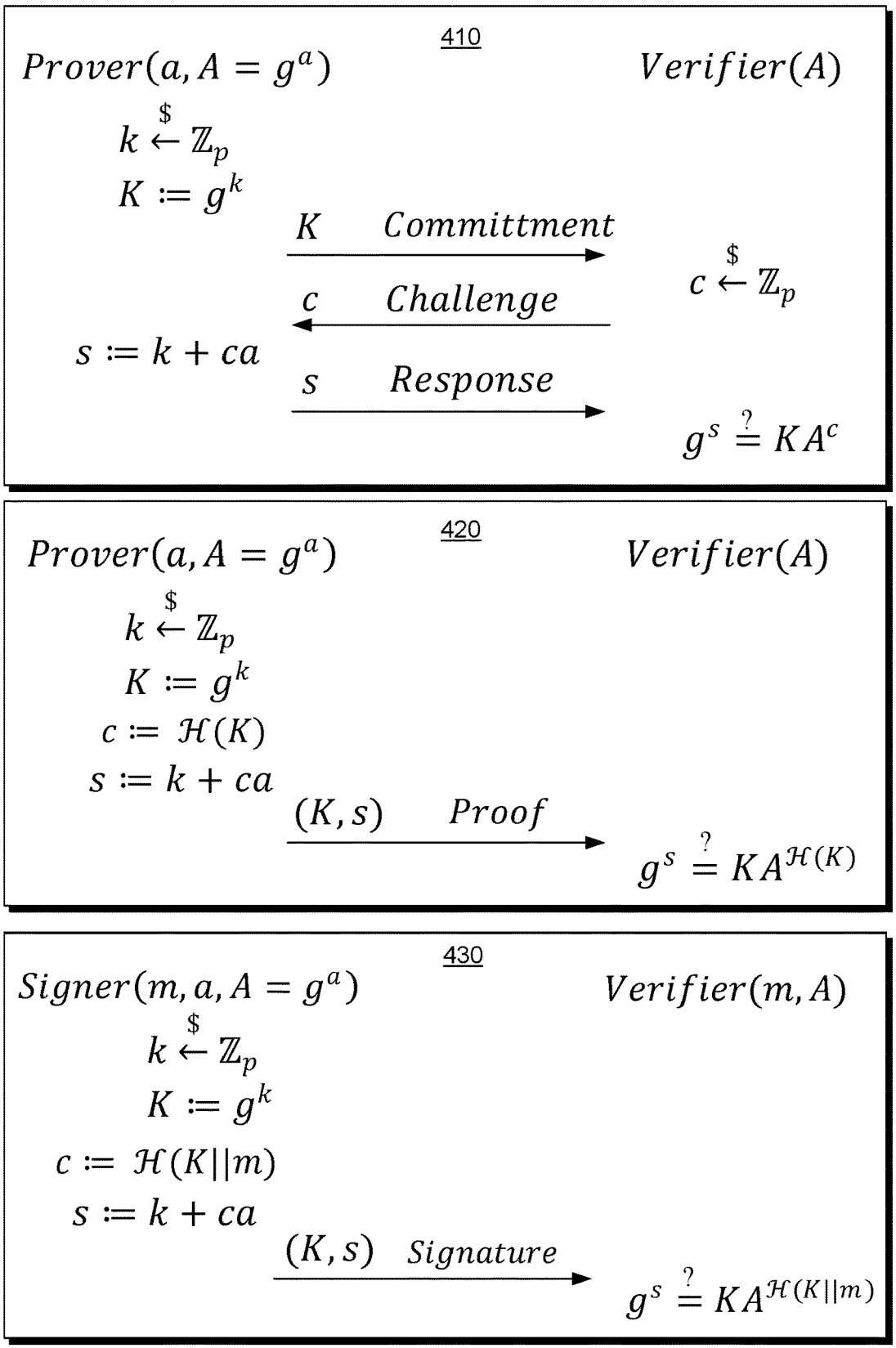
FIG. 4 illustrates examples of some zero-knowledge authentication schemes.

FIG. 4 shows examples of an interactive scheme 410, a non-interactive scheme 420 and a signature scheme 430. Such schemes may be understood, for example, with respect to aforementioned interactive, non-interactive and signature schemes (see, e.g., foregoing definitions of: a, A, g, k, Zp, K, g, s, H, and m).

As to implementation, one or more approaches may be taken. For example, consider an elliptic curve version of an interactive scheme (e.g., a Schnorr interactive protocol scheme) where P and V agree on an elliptic curve E over a field Fn and a generator G where they both know B and P claims to know x such that B=xG. In such an example, P wants to prove this fact to V without revealing x. Such a protocol may include the following: (i) P generates random r in Fn and computes the point A=rG; (ii) P transmits the point A to V; (iii) V computes random c as H(G, B, A) and transmits c to P; P computes s=r+cx(mod n) and sends s to V; and (iv) V checks that sG−cB=(r+cx)G−cB=rG+cxG−cxG=rG=A.

In such an example, a single round of interaction can provide proof as V's "coin flips" are simulated using a hash function H known to V alone. A dishonest P has a negligible chance of cheating as P would have to fix the value of sG−cB before receiving V's hash value c. Under the assumption that the hash function used by V is secure, a P that does not know x, the discrete logarithm of B, cannot cheat.

In terms of a digital signature, an agreement can be made on an initial message m and V's random choices can be replaced with bits produced by a secure hash function (see, e.g., Schnorr signature scheme). In such an example, P and V can agree on an elliptic curve E over a field Fn, a generator G, a point Pt that represents the message m that P wants to send and a hash function H (e.g., SHA-1, etc.). In such an example, P and V can both know B while P claims to know x such that B=xG where P does not want to reveal x to V. In such an example: (i) P can generate random r and compute the point A=rG; (ii) P can compute c=H(xPt, rPt, rG); (iii) P can compute s=r+cx(mod n); (iv) P can transmit to V the message "s||x*Pt||r*Pt||r*G"; (v) V can compute c; (vi) V can check that sG=(r+cx)G=rG+cxG=rG+cB=A+cB; and (vii) V can check that sPt=(r+cx)Pt=rPt+cxPt.

In the foregoing example, P simulates both P and V through use of a hash function and publishes the transcript of the dialogue. In such an approach, P sends a single message and V either accepts or rejects. P generates a random number while V's random choices are simulated by hashing the input along with a value calculated from P's choice of r. Thus, V's random choice depends on P's random choice (e.g., hard to fake the outcome). The value c is a type of challenge for P as it is computed from the hash function H and it is out of P's control. If P does not know x, to cheat, P would have to find s satisfying sG=rG+cxG, which is an instance of the discrete logarithm problem. P cannot cheat by enumerating random r values, as it would be too hard to find a matching value for c.

As an example, a ZK scheme may be implemented using code executable in an operating system environment (e.g., OS environment). As an example, code can be executable to perform one or more operations of elliptic curve cryptography. For example, consider defining an elliptic curve over binary fields with an equation $y^2+xy=x^3+x^2+1$ along with irreducible polynomial $f(x)=x^{163}+x^7+x^6+x^3+1$. In such an example, private key generation time can be less than one second on a lightweight microprocessor, while public key generation may be less than one minute. As an example, a device can include circuitry such as a trusted platform module (TPM or TPM chip, etc.). As an example, such circuitry can include one or more features such as, for example, one or more of RSA encryption and signature, ECC encryption and signature, ECC-DAA, SHA-1, SHA-256, HMAC-AES, etc. As indicated, circuitry can include elliptic curve and hash features.

As an example, a ZK scheme may be tailored for purposes of lightweight communication. For example, consider a non-interactive approach that can be less than approximately 200 bytes (e.g., for 802.XX.X packet(s) such as IEEE 802.15.4 packets), where minimization of packets can help to conserve energy.

An article by Chatzigiannakis et al., "Elliptic Curve Based Zero Knowledge Proofs and Their Applicability on Resource Constrained Devices", MASS '11 Proceedings of the 2011 IEEE Eighth International Conference on Mobile Ad-Hoc and Sensor Systems, pages 715-720, October 17-22, 2011, is incorporated by reference herein, which describes elliptic curve cryptography (ECC) approaches to ZK schemes. As an example, one or more methods may utilize an elliptic curve-based ZK scheme (e.g., ZK protocol, etc.). As an example, on a lightweight processor (e.g., 8 MHz or 16 MHz), a ZK scheme may be run in less than approximately one minute. As an example, a Schnorr interactive protocol may be utilized, which may provide for more efficient execution time, energy consumption, code size and message size when compared, for example, to a Schnorr non-interactive protocol. As an example, an approach may utilize a mobile device that can establish an operating system environment such as, for example, iOS or ANDROID. In such an example, the mobile device may have a processor with a speed of 1 GHz or more (e.g., ARMv7 SNAPDRAGON with 512 MB flash memory and 576 MB RAM).

As mentioned, a TPM approach may be utilized where, in comparison to a preloaded elliptic curve and parameters in regular memory/storage, additional security may be provided.

Figure 5:
FIG. 5 illustrates an example of a system and an example of a method.
Figure 5:
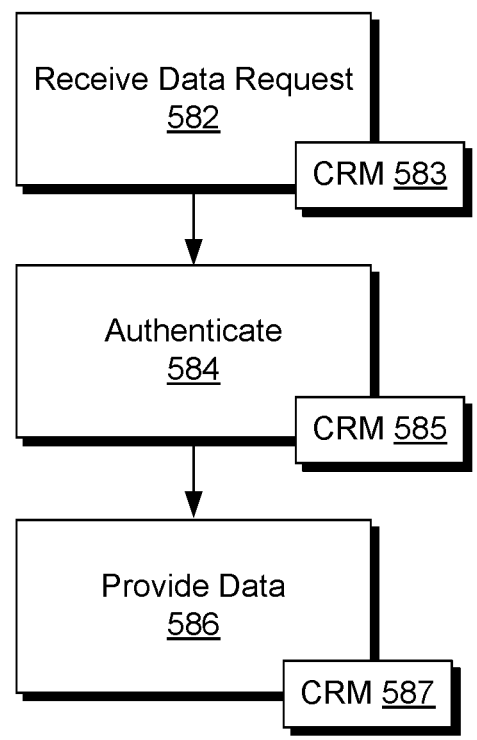

FIG. 5 shows an example of a system 500 that includes a client 510 and a server 550 where the client 510 aims to access data stored in a data storage managed by the server 550. To do so, the system 500 can utilize an interactive ZK authentication scheme or a non-interactive ZK authentication scheme. As an example, the system 500 can be the system 200 of FIG. 2 where, for example, the client 510 is a client device in the client layer 210 and where the server 550 can be a server in one or more of the other layers (e.g., the applications layer 240, the storage layer 260, etc.).

FIG. 5 also shows an example of a method 580 that includes a reception block 582 for receiving a data request, an authentication block 584 for authenticating the requester, and a provision block 586 for providing the requested data (e.g., transmission, access, etc.). The method 580 can be viewed as a server-side method as executed by the server 550. A method may be a client-side method, for example, as executed by the client. For example, consider issuing a request for data and, responsive to authentication of the requester (e.g., the client), receiving requested data (e.g., or access thereto, etc.).

As an example, the method 580 can include, via the reception block 584, receiving a request from a requester for subsurface geophysical data of a geologic environment; via the authentication block 584, responsive to the request, authenticating the requester using a zero-knowledge authentication scheme; and, via the provision block 586, responsive to authentication of the requester, providing access to at least a portion of the subsurface geophysical data of the geologic environment.

The method 580 is shown in FIG. 5 in association with various computer-readable media (CRM) blocks 583, 585 and 587 (e.g., non-transitory media that are not carrier waves and that are not signals). Such blocks generally include instructions suitable for execution by one or more processors (or cores) to instruct a computing device or system to perform one or more actions. While various blocks are shown, a single medium may be configured with instructions to allow for, at least in part, performance of various actions of the method 500. As an example, a computer-readable storage medium (CRM) is a non-transitory computer-readable storage medium that is not a carrier wave and that is not a signal. One or more CRM blocks may be provided for graphical user interfaces (GUIs), etc. One or more CRM blocks may be provided for rendering information to a display, etc. (e.g., consider rendering a model to a display, etc.). As an example, one or more blocks (e.g., action blocks, CRM blocks, etc.) may be provided as to a client-side implementation of various actions that can occur on a client-side. For example, consider a transmission block for transmitting a request, a formulation block for formulating data to transmit, an access block for accessing data responsive to authentication of a request, etc.

As an example, a system can include server-side and client-side blocks. As an example, a system may include one or more third-party blocks, for example, consider a third-party as a generator of particular information (e.g., a key pair generator, etc.). As an example, a system may utilize a wallet approach where a user can possess a wallet.

As to an example of a wallet, consider a crypto wallet as a device, physical medium, program or a service that stores the public and/or private keys where, for example, the wallet can be used to track ownership, receive or spend cryptocurrencies (e.g., cryptocurrency-like permissions, etc.). As an example, one or more cryptocurrency-like permissions may be derived from a wallet where such cryptocurrency-like permissions may be decentrally stored and maintained in a ledger such as, for example, a blockchain. As an example, a system may generate wallets that can include information that can be utilized for requesting access to data. As mentioned, in a currency context, a user may access data by spending currency, which can be a type of permission in that when the currency is spent, the user can no longer access such data.

Figure 6:
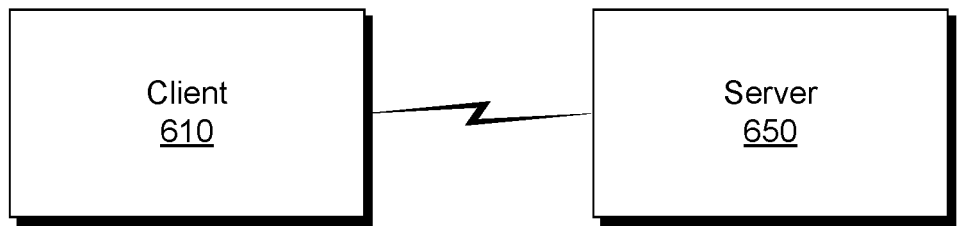
FIG. 6 illustrates an example of a system and an example of a method.
Figure 6:
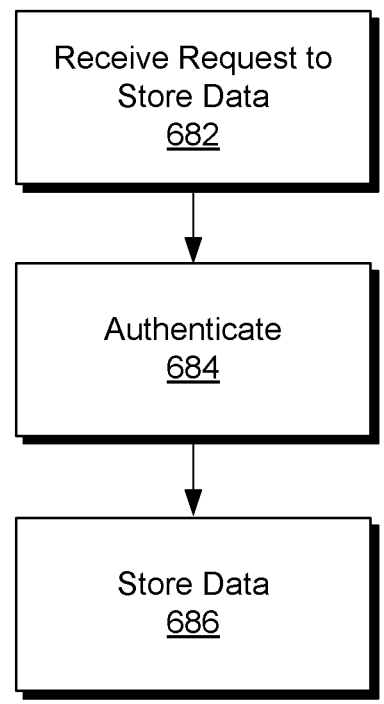

FIG. 6 shows an example of a system 600 that includes a client 610 and a server 650 where the client 610 aims to store data in a data storage managed by the server 650. To do so, the system 600 can utilize a ZK signature scheme. In such an approach, the server 650 may store the data if the client 610 provides a signature that can be authenticated by the server 650. In such an example, the server 650 can store the data optionally without having knowledge of who is operating the client 610; yet, with assurance that the operator of the client 610 (e.g., or the client 610 itself) is authorized to store data. Such an approach can help the server 650 assure that data being stored are from authorized sources. As an example, data can be provided as a message or messages where a decision is made to store such message or messages if there is an accompanying signature or signatures that can be verified. As an example, the system 600 can be the system 200 of FIG. 2 where, for example, the client 610 is a client device in the client layer 210 and where the server 650 can be a server in one or more of the other layers (e.g., the applications layer 240, the storage layer 260, etc.).

FIG. 6 also shows an example of a method 680 that includes a reception block 682 for receiving a request to store data, an authentication block 684 for authenticating the requester, and a storage block 686 for storing the data. The method 680 can be viewed as a server-side method as executed by the server 650. A method may be a client-side method, for example, as executed by the client. For example, consider issuing a request to store data and, responsive to authentication of the requester (e.g., the client), transmitting data for storage and/or receiving an indication that data have been stored.

Figure 7:
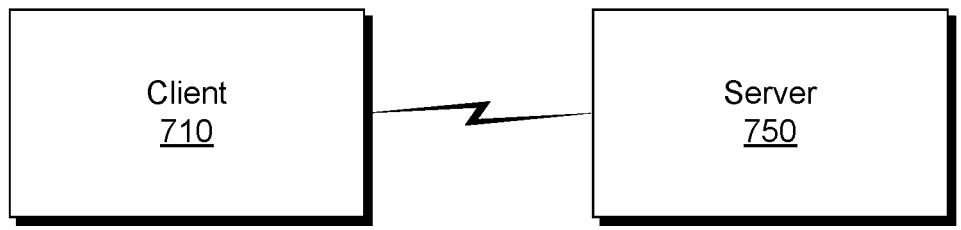
FIG. 7 illustrates an example of a system and an example of a method.
Figure 7:
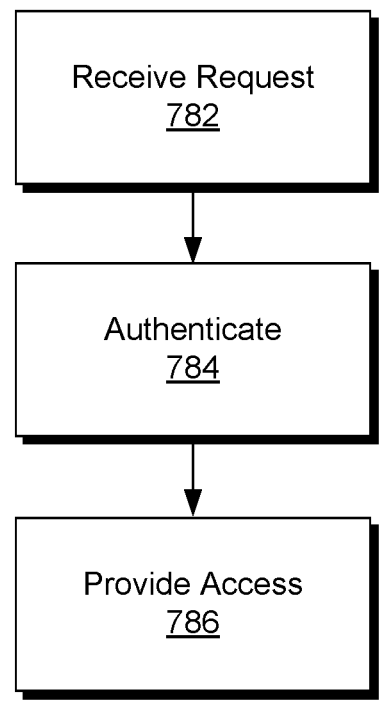

FIG. 7 shows an example of a system 700 that includes a client 710 and a server 750 where the client 710 requests some service managed by the server 750. To do so, the system 700 can utilize a ZK digital currency scheme (e.g., a digital cryptocurrency, etc.). For example, the client 710 can possess digital currency, which may be particular to the system 700. Such digital currency can be part of a scheme that utilizes one or more features of the ZCASH scheme. For example, consider use of zk-SNARKs where transactions can be shielded (e.g., controlled by a z-addr). As an example, transactions may be auditable where disclosure may be under control of the client 710 (e.g., operator of the client 710, etc.). As an example, the system 700 can be the system 200 of FIG. 2 where, for example, the client 710 is a client device in the client layer 210 and where the server 750 can be a server in one or more of the other layers (e.g., the applications layer 240, the storage layer 260, etc.).

As an example, digital currency can be assigned to one or more users for use of a computational framework (e.g., DELFI framework, PETREL framework, etc.). Such digital currency can be a single-use digital currency. An amount of digital currency may be specified according to a project and may be suitable to "buy" time, amount of data, etc.

As an example, data can be owned and restricted as to access. As an example, restrictions can be set in place by an owner, which may provide one or more schemes for one or more internal and/or external parties.

As an example, data can be stored in a cloud environment. In such an example, the data can be a data file or data set that may be stored in a manner that is not distributed. For example, a single drive may store the entire data file or data set. Or, alternatively, a data file or data set may be broken into portions and distributed such that it is stored on multiple drives. Such an approach may be a data protection approach offered in one or more cloud environments. As an example, a ZK scheme or schemes may be utilized for data stored on a single drive or data stored on multiple drives. As to the latter, a ZK scheme may be utilized for authenticated access to a cloud provider's internal security mechanism where the internal security mechanism acts to access the appropriate data as stored in a distributed manner.

As to facilities of a computing device, consider a trusted platform module (TPM). As an example, a TPM may comply with the TPM 2.0 specification, which includes a Direct Anonymous Attestation (DAA) scheme, which is a cryptographic primitive that enables remote authentication of a trusted computer whilst preserving privacy of the platform's user. As an example, a DAA protocol can be based on three entities and two different steps. The entities can be the DAA Member (TPM platform or EPID-enabled microprocessor), the DAA Issuer and the DAA verifier. The issuer can be charged to verify the TPM platform during a join step and to issue DAA credential to the platform. The platform (e.g., member) can use the DAA credential with the verifier during a sign step. Through a zero-knowledge proof the Verifier can verify the credential without attempting to violate the platform's privacy. DAA can support a blacklisting capability, for example, such that a verifier can identify attestations from a source that has been compromised.

With reference to the system 200 of FIG. 2, as an example, one or more types of data, resources, etc., may be protected using a DAA approach that demands attestation via remote authentication of a trusted computer while, for example, preserving privacy of the platform's user.

Figure 8:
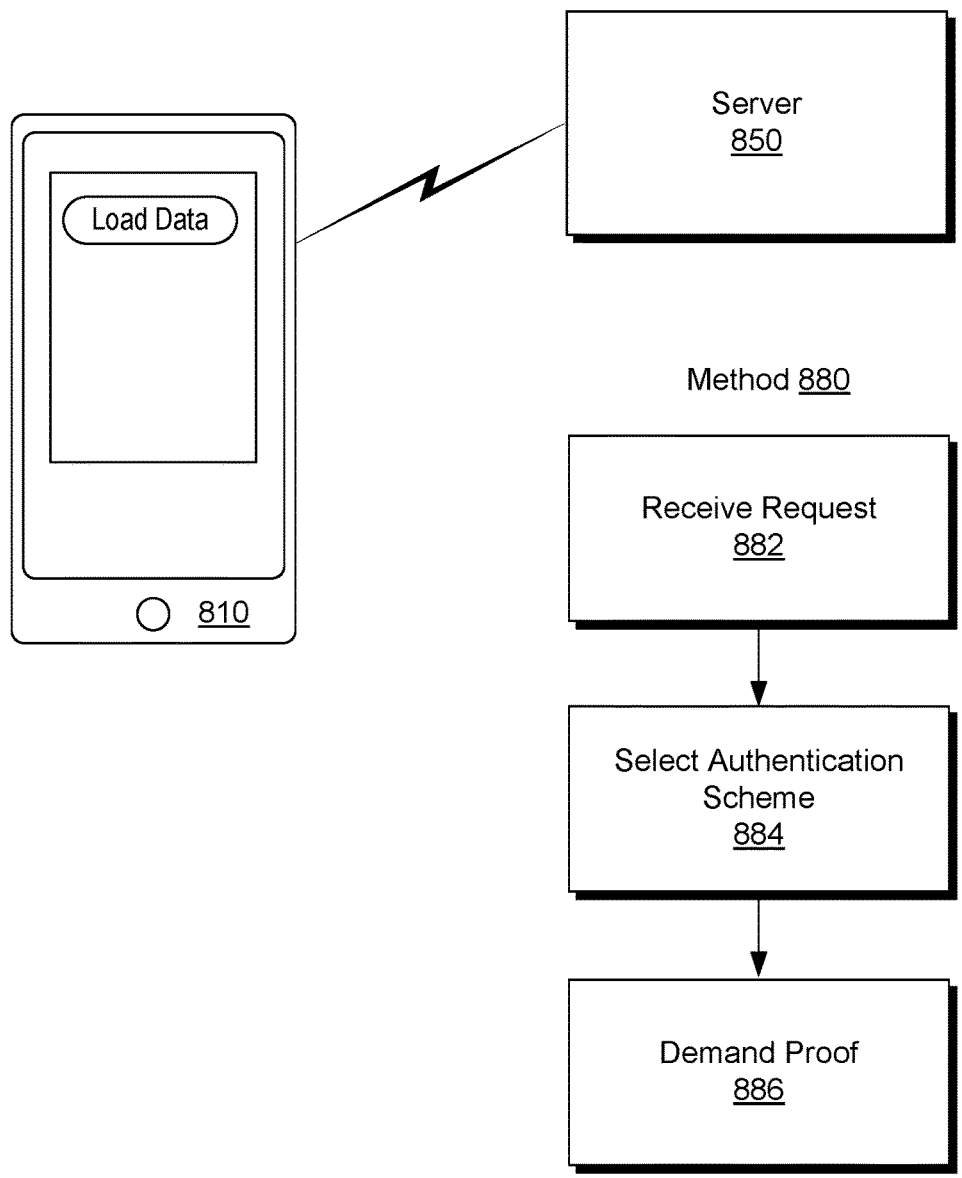
FIG. 8 illustrates an example of a system and an example of a method.

FIG. 8 shows an example of a system 800 that includes a mobile device 810 and a server 850 along with an example of a method 880. In such an example, a graphical user interface may be rendered to a display of the mobile device 810 that allows for transmission of a request for loading (e.g., accessing) data from a remote storage device as managed by the server 850. In such an example, per a reception block 882, the server 850 can receive the request, per a selection block 884, the server 850 can select an authentication scheme, and per a demand block 886, the server 850 can demand that the mobile device 810 prove a fact according to the selected authentication scheme. As an example, the system 800 can be the system 200 of FIG. 2 where, for example, the mobile device 810 is a client device in the client layer 210 and where the server 850 can be a server in one or more of the other layers (e.g., the applications layer 240, the storage layer 260, etc.).

In the example of FIG. 8, the selection block 884 may operate using one or more types of information gleaned from the request transmitted by the mobile device 810. For example, consider geolocating of the request using an IP address and/or one or more other types of information (e.g., GPS, WIFI, etc.). In such an example, the server 850 may determine that the mobile device 810 is in a location that demands authentication where a level of authentication may be selected. For example, consider selection of an interactive scheme or a non-interactive scheme. As an example, for an interactive scheme, a number of trials may be indicated where, for example, probability of a fact being proven increases with an increasing number of trials. In such an approach, each trial may be relatively lightweight computationally though may be increased where the server 850 suspects or has one or more indications of a demand for increased security. For example, if the mobile device 810 is in a trusted region of the world and/or using a trusted network or networks, the server 850 may select a scheme with a fewer number of trials than if trust is not demonstrated where the scheme may be selected with a greater number of trials. In a trial-based approach, the server 850 can analyze each of the trials and, if one or more of the trials is faulty, the server 850 may deny access (e.g., as a faulty trial may be indicia of malicious intent, guessing, etc.).

As an example, the server 850 may select an authentication scheme based on one or more aspects of data requested. For example, some data of a seismic survey, a well log, etc., may be less valuable than other data. In such an example, where a request is for data that is valuable (e.g., as to one or more reservoir properties), the server 850 may select a more robust authentication scheme; whereas, if data are for a region that is of little interest in resource production, the server 850 may select an authentication scheme that is less robust (e.g., consider a fewer number of trials, etc.).

As an example, the server 850 may determine that data requested are live data, such as a live data feed from the field. In such an example, the server 850 may select an authentication scheme that can be time limited. For example, the authentication scheme may demand re-authentication at regular and/or irregular time intervals, data intervals, etc. In such an approach, a scheme may be selected that is sufficiently robust but that does not distract from the real-time nature of the live data. For example, a method can include assessing one or more characteristics of live data (e.g., sampling rate, upload rate, etc.) and selecting one or more characteristics of authentication based on the one or more live data characteristics. In such an example, if live data are periodic (e.g., in chunks, etc.), the server 850 may request re-authentication prior to providing access to a subsequent set of data (e.g., a subsequent chunk, etc.).

As an example, where data are streamed (e.g., live or other), a selected authentication scheme may involve a number of trials where an initial trial provides access to some data and where each subsequent trial occurs thereafter. In such an approach, as the amount of data accessible increases, so does the robustness of the authentication. As mentioned, in a trial-based approach, as the number of trials increases, the probability of trust can increase. Accordingly, a scheme can aim to increase trust (e.g., demand more trust) in a manner that increases with the amount of data provided, demanded, etc.

As an example, consider a first trial to gain access to 1 MB of data, a second trial to gain access to another 1 MB of data for a total of 2 MB of data, a third trial to gain access to yet another 1 MB of data for a total of 3 MB of data, etc. In such an example, the number of trials increases with the amount of data in a hand-in-hand manner. Such an approach aims to be self-regulating whereby more data results in increased trust. For seismic data, such an approach can be suitable as a user may not be able to discern features of a reservoir until a suitable amount of data have been provided (e.g., accessed). In view of the foregoing example, data chunks may be of the order of 1 GB rather than 1 MB. As an example, a server may, after a sufficient number of trials, forego further trials as a level of trust may be probabilistically assured.

As an example, where the server 850 determines that the mobile device 810 is communicating via a satellite or other expensive or constrained network or networks, the server 850 may select an authentication scheme that is efficient for the determined condition or conditions. As an example, the server 850 may select an authentication scheme on the basis of ownership of the data requested. For example, an owner may have more privileges as to the data such that zero-knowledge is appropriate to avoid exposure of knowledge that could gain access to such privileges; whereas, a non-owner may have fewer to no privileges as to the data (e.g., editing, adding, moving, etc.) such that a less knowledge-secure scheme may be selected.

Figure 9:
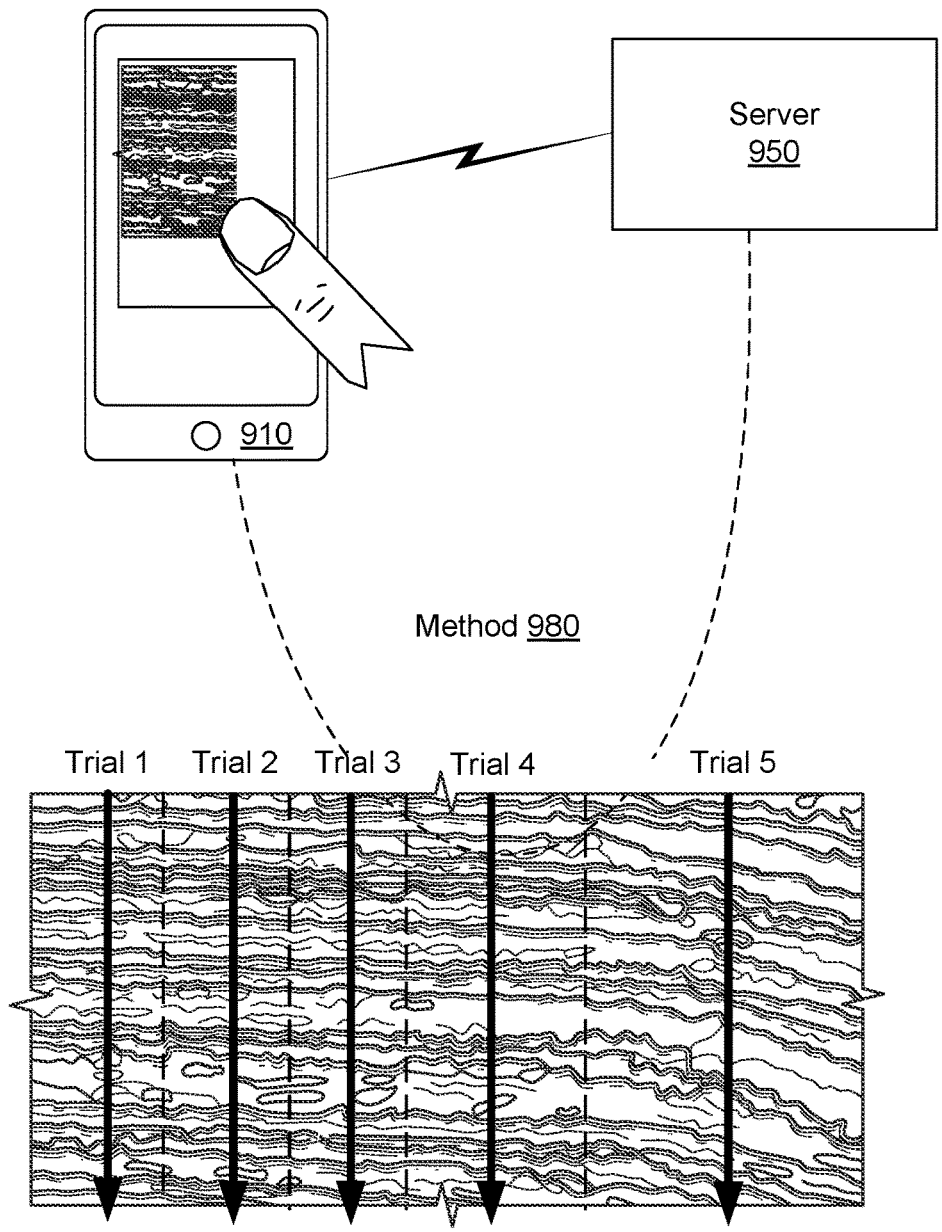
FIG. 9 illustrates an example of a system and an example of a method.

FIG. 9 shows an example of a system 900 and an example of a method 980 where a client device 910 requests data via a server 950 where the server 950 controls how authentication is to occur. As shown, the server 950 can control access via trials such as providing access to data for a first trial of an authentication scheme, providing access to additional data for a second trial of an authentication scheme, etc., where, for example, as probability increases as to knowledge of a secret by the client device 910, access may be provided to greater amounts of data. As shown, the data can be seismic where, to get a fuller view of the surveyed region of the Earth, the client device 910 is iteratively subjected to a series of trials.

As an example, the system 900 can be the system 200 of FIG. 2 where, for example, the client device 910 is a client device in the client layer 210 and where the server 950 can be a server in one or more of the other layers (e.g., the applications layer 240, the storage layer 260, etc.).

While FIG. 9 shows an example of seismic survey data, consider well log data where, for example, additional data may be subject to further trials.

In the example of FIG. 9, or one or more other data examples, data resolution may be controlled using a trial based approach. For example, to gain more resolution of seismic image data, a requester may be subjected to additional trials. In such an approach, assurances can be increased for the finest resolution seismic data.

Figure 10:
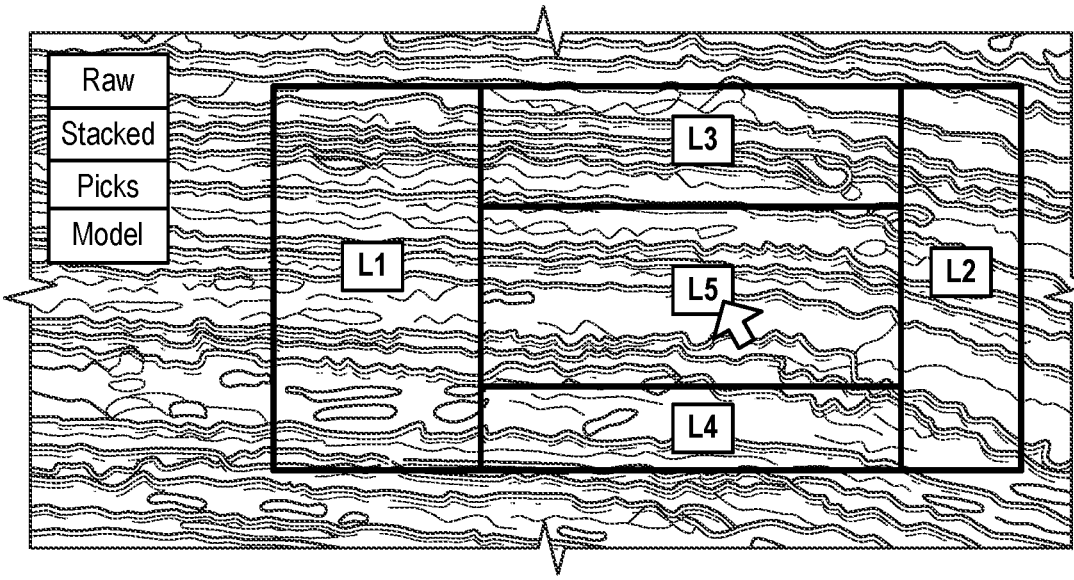
FIG. 10 illustrates examples of graphical user interfaces.
Figure 10:
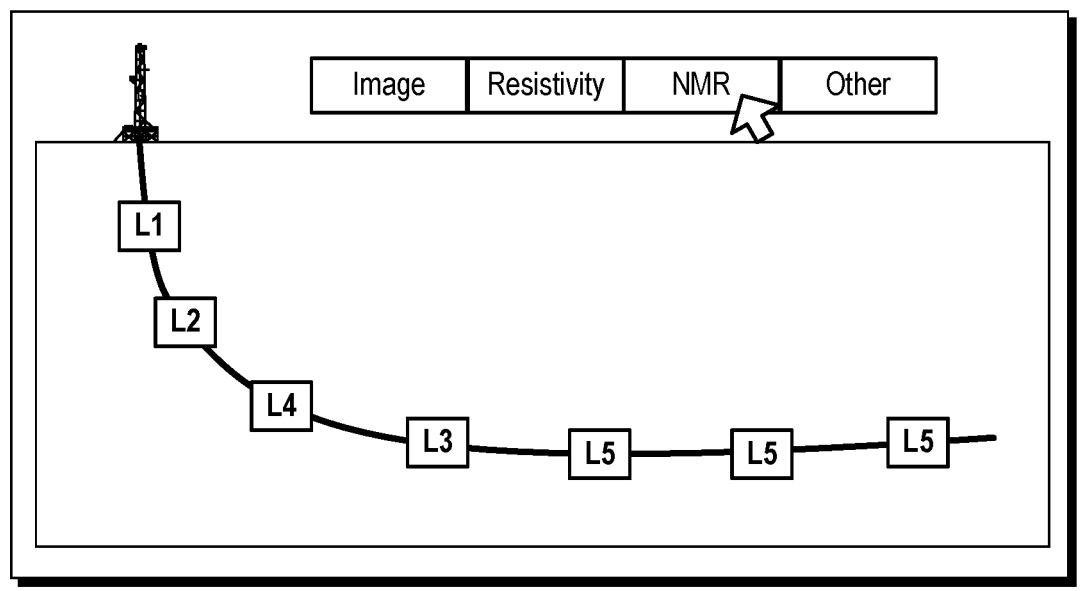

FIG. 10 shows examples of graphical user interfaces 1010 and 1030. As an example, such GUIs may be part of a system such as, for example, the system 200 of FIG. 2.

In the example of FIG. 10, the GUI 1010 shows seismic data in a two-dimensional space where the data can include traces, which may be organized with respect to one or more dimensions, which can include, for example, time as a dimension (e.g., a proxy for depth, etc.). In the GUI 1010, regions are labeled with labels L1, L2, L3, L4 and L5, which represent different levels of security. In such an example, L5 can represent a highest level of security while L1 is a lower level of security. As an example, such regions can be assigned corresponding levels of security automatically, semi-automatically or manually. For example, an automatic approach may utilize details discerned from picking features in seismic data as part of an interpretation process where some features picked may be associated with a reservoir, which can be considered a high value target. In such an automatic approach, the reservoir can be assigned a high level of security as the seismic data, seismic attributes, seismic interpretations, etc., are of high value (e.g., identifying where extractable resources exist in a geologic environment). As to different types of data, consider one or more graphical controls that can be utilized to select a particular type of data such as, for example, raw, stacked, picks, model, etc. As to raw, it may provide for raw seismic data as acquired by a seismic acquisition system. As to stacked, it may provide for stacked seismic data as processed by a seismic data processing framework. As to picks, it may provide for data that has been interpreted using one or more seismic interpretation frameworks. As to model, it may provide for one or more types of models such as, for example, a velocity model, a stratigraphic model, an earth model, etc.

A user may, optionally without knowledge of such assigned levels, request certain data (e.g., seismic data, data derived at least in part from seismic data, etc.). In such an example, upon receipt of the request, a computational framework (e.g., an executing application on a server, etc.) may implement a corresponding security protocol, which can be a zero-knowledge scheme (ZK scheme). In such an example, a level may depend on one or more of a number of interactions as a parameter, a digital binary bit or byte length as a parameter, a type of hash function as a parameter, a type of space (e.g., elliptic curve, etc.) as a parameter, etc. Such an approach can increase security for high value data, which can help to protect high value data.

As an example, where a user makes a request for data of one region, successful execution of a security protocol may be taken into account for a request for another region, which may be at the same level of security or higher. Where the subsequent request is for a higher level, the user may be presented with another instance of the security protocol or a different security protocol where the multiple instances, prior and subsequent, increase assurances that the user has the appropriate knowledge (e.g., consider one or more of the security protocols being a ZK scheme).

As an example, where a security protocol is interactive, levels may be associated with number of interactions. For example, L1 may be a single interaction, L2 may be four interactions, L3 may be eight interactions, L4 may be 16 interactions and L5 may be 36 interactions. While such an approach may take some time to execute, it may test a requester's patience, which may be an additional deterrent to accessing certain data. As mentioned with respect to Ali Baba's cave, a protocol can be probabilistic where probability of a requester (e.g., a prover) having knowledge increases as the number of trials (e.g., interactions) increases.

As to the example GUI 1030, it shows a trajectory of a borehole, a completed well, a partially completed well, etc. In such an example, one or more types of data may be acquired that are organized with respect to the trajectory. For example, consider logging-while-drilling (LWD) data, measurement-while-drilling (MWD) data, wireline data, etc., which may be organized with respect to one or more spatial dimensions such as depth (e.g., total vertical depth, measured depth, etc.). In such an example, one or more levels of security can be assigned, optionally using a GUI such as the GUI 1030. As an example, levels may be assigned automatically, semi-automatically, or manually. For example, where a trajectory is in contact with a reservoir, a level may be higher.

As shown in the example GUI 1030, types of data may include image, resistivity, NMR, or other data. As with the example GUI 1010, data security levels and/or regions may be assigned on the basis of type of data. In such an approach, certain data may be more sensitive or valuable than other data. As an example, sensitive data may depend on ownership, cost to acquire, contractual obligations, government regulations, etc. As mentioned, valuable data may reveal particular aspects of a formation, quality of a borehole, how a borehole was drilled, etc.

In the examples of FIG. 10, one or more ZK schemes may be utilized that depend on one or more characteristics of data, which may be regional and reflect value and/or other concerns as to how the data are to be handled.

As an example, a client can be authenticated on using a mobile/web application using a ZK scheme such that the client can receive data such as, for example, well data (e.g., well log data, seismic data, etc., such that details of a project can be viewed on client device using the application.

As an example, a ZK scheme can be utilized to access to one or more search facilities of a system or systems such as, for example, the system 300 of FIG. 3. For example, consider access to search facilities to search for and browse wells, well logs, well files, deviation surveys, markers, perforations, checkshot surveys, core intervals, seismic data, etc. (see also, e.g., the GUIs 1010 and 1030 of FIG. 10). As an example, a ZK scheme can provide for remote visualization of one or more of well logs, well files, markers, perforations, checkshots surveys, core intervals, etc., which may be via a log viewer, deviation surveys in a 3D viewer, etc.

As an example, a method may provide for communication security with protections as to communications, files being shared, etc.

As an example, a method may provide for proving knowledge of some secret (or many secrets) to somebody without actually revealing the secret.

As explained, a ZK implementation architecture uses cryptographic technology and can demand trust of a device that runs code. Various mobile device operating systems can provide for a trustworthy runtime environment. Such trustworthiness may be imparted by one or more features associated with digital telephony (e.g., SIM technology, etc.) or, for example, via inclusion of a TPM or other cryptographic function circuitry.

As an example, a ZK scheme may involve a single trial or multiple trials.

As an example, a user can log into an authentication server where a series of mathematical challenges are sent to the user's browser from the server where each of the challenges demands a corresponding response. In such an example, the server may authenticate the user (e.g., user device) if the challenges are responded to correctly by the user's browser. In such a scheme, a different set of challenges can be presented for each new verification attempt.

As an example, a method can include receiving a request from a requester for subsurface geophysical data of a geologic environment; responsive to the request, authenticating the requester using a zero-knowledge authentication scheme; and, responsive to authentication of the requester, providing access to at least a portion of the subsurface geophysical data of the geologic environment. In such an example, authenticating can prove that the requester possesses a secret without revealing the secret. In such an example, a secret can be considered to be private knowledge, which may be a witness (see, e.g., witness w).

As an example, a request can include an inherent challenge derived at least in part using a hash function and, for example, a method that receives the request can include authenticating that verifies the inherent challenge.

As an example, a zero-knowledge authentication scheme can be an interactive scheme. As an example, a zero-knowledge authentication scheme can be a non-interactive scheme. As an example, authenticating can include using an interactive scheme and a non-interactive scheme (e.g., in parallel, sequentially, etc.).

As an example, subsurface geophysical data can include seismic data. In such an example, a method can include providing access to a portion of the seismic data for a region of the geologic environment. In such an example, a method can include re-authenticating a requester via a subsequent challenge and, responsive to the re-authenticating, providing access to an additional portion of the seismic data for the region of the geologic environment. In such an example, the additional portion of the seismic data for the region can be seismic data that increases resolution of the prior portion of the seismic data for the region. As an example, a method can include re-authenticating a requester via a subsequent challenge and, responsive to the re-authenticating, providing access to an additional portion of the seismic data for a different region of the geologic environment.

As an example, a method can include iteratively providing access to portions of subsurface geophysical data via a series of iterations, where each of the iterations depends on a corresponding authentication of a requester using one or more zero-knowledge authentication schemes. For example, a scheme may be an interactive scheme where, as the number of successful iterations increases, the probability of trust increases (e.g., probability that the requester possess a secret, etc.).

As an example, a method can include analyzing a request for geolocation of a requester and selecting a zero-knowledge authentication scheme based at least in part on the geolocation of the requester. In such an approach, analyzing for geolocating can be via one or more types of data (e.g., IP address, GPS, WIFI, etc.).

As an example, a method can include analyzing a request for an operating system type of a requester and selecting a zero-knowledge authentication scheme based at least in part on the operating system type of the requester. For example, consider an operating system of a mobile device, an Internet-of-Things (IoT) device, a workstation, etc., where each of the types of devices can have an operation system that is indicative of one or more resources of that device that may be suitable for one or more particular authentication schemes (e.g., byte length, type of computational mechanism, etc.). As an example, an authentication scheme can be involve a discrete logarithm approach. As an example, an authentication scheme can involve an elliptic curve approach.

As an example, a method can include analyzing a request for a type of communication network utilized by a requester and selecting the zero-knowledge authentication scheme based at least in part on the type of communication network. For example, a satellite network may result in selection of a scheme that differs from a hardwired network connection. Such a selection may account for network security, transport protocol, message size, stability, speed, bandwidth, etc.

As an example, subsurface geophysical data can include authenticated subsurface geophysical data. For example, consider data that is signed via a digital signature, which may be, for example, a zero-knowledge digital signature.

As an example, a method can include receiving a zero-knowledge digital signature and responsive to authentication of the zero-knowledge digital signature, authenticating subsurface geophysical data for storage. In such a manner, a data storage system can be assured that the source of the data possessed certain knowledge (e.g., a secret, etc.).

As an example, a method can include, responsive to a request, issuing a challenge to a requester, and, responsive to the challenge, receiving a response from the requester. Such an approach can be interactive and optionally be repeated one or more times, which may act to increase probability that the requester possesses knowledge (e.g., a secret).

As an example, a method can include authenticating that utilizes public knowledge to verify private knowledge of a requester without revealing the private knowledge of the requester. In such an example, the public knowledge can be or include a public key and the private knowledge can be or include a private key. As an example, a public key and private key pair may exist, which may, for example, optionally be stored in a wallet.

As an example, a system can include a processor; memory accessible to the processor; processor-executable instructions stored in the memory and executable by the processor to instruct the system to: receive a request from a requester for subsurface geophysical data of a geologic environment; responsive to the request, authenticate the requester using a zero-knowledge authentication scheme; and, responsive to authentication of the requester, provide access to at least a portion of the subsurface geophysical data of the geologic environment.

As an example, one or more computer-readable storage media can include computer-executable instructions executable to instruct a computing system to: receive a request from a requester for subsurface geophysical data of a geologic environment; responsive to the request, authenticate the requester using a zero-knowledge authentication scheme; and, responsive to authentication of the requester, provide access to at least a portion of the subsurface geophysical data of the geologic environment. As an example, one or more computer-readable storage media can be in the form of a computer program product that includes computer readable program code embodied therein for performing one or more methods (see, e.g., the methods 580, 680, 780, 880, 980, etc.).

Figure 11:
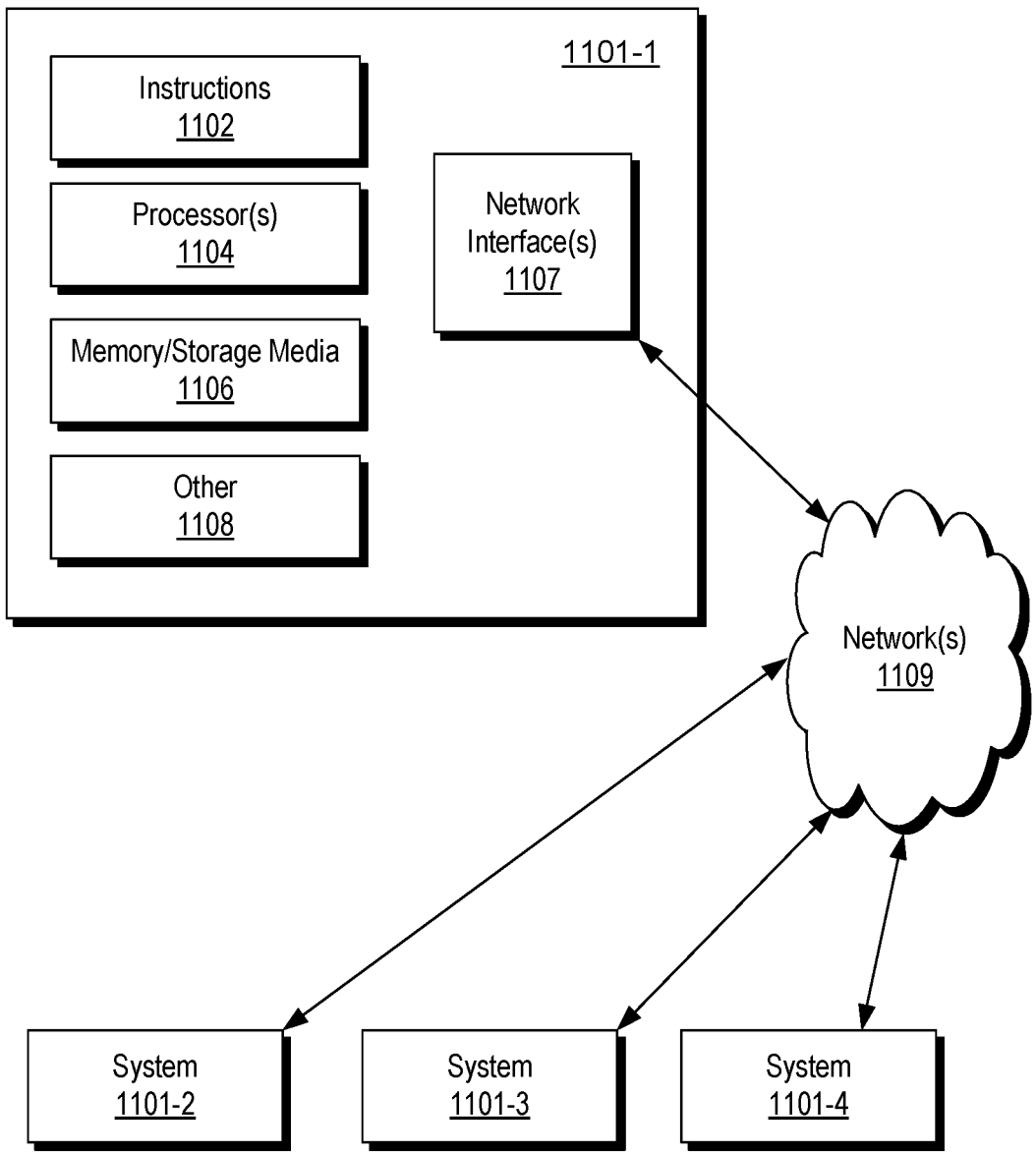
FIG. 11 illustrates examples of computing and networking equipment.

In some embodiments, a method or methods may be executed by a computing system. FIG. 11 shows an example of a system 1100 that can include one or more computing systems 1101-1, 1101-2, 1101-3 and 1101-4, which may be operatively coupled via one or more networks 1109, which may include wired and/or wireless networks.

As an example, a system can include an individual computer system or an arrangement of distributed computer systems. In the example of FIG. 11, the computer system 1101-1 can include one or more sets of instructions 1102, which may be or include processor-executable instructions, for example, executable to perform various tasks (e.g., receiving information, requesting information, processing information, simulation, outputting information, etc.). In the example of FIG. 11, the one or more sets of instructions 1102 can include, for example, instructions of one or more methods such as, for example, the method 580, the method 680, the method 780, the method 880, the method 980, etc.

As an example, a set of instructions may be executed independently, or in coordination with, one or more processors 1104, which is (or are) operatively coupled to one or more storage media 1106 (e.g., via wire, wirelessly, etc.). As an example, one or more of the one or more processors 1104 can be operatively coupled to at least one of one or more network interface 1107. In such an example, the computer system 1101-1 can transmit and/or receive information, for example, via the one or more networks 1109 (e.g., consider one or more of the Internet, a private network, a cellular network, a satellite network, etc.).

As an example, the computer system 1101-1 may receive from and/or transmit information to one or more other devices, which may be or include, for example, one or more of the computer systems 1101-2, etc. A device may be located in a physical location that differs from that of the computer system 1101-1. As an example, a location may be, for example, a processing facility location, a data center location (e.g., server farm, etc.), a rig location, a wellsite location, a downhole location, etc.

As an example, a processor may be or include a microprocessor, microcontroller, processor component or subsystem, programmable integrated circuit, programmable gate array, or another control or computing device.

As an example, the storage media 1106 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

Figure 12:
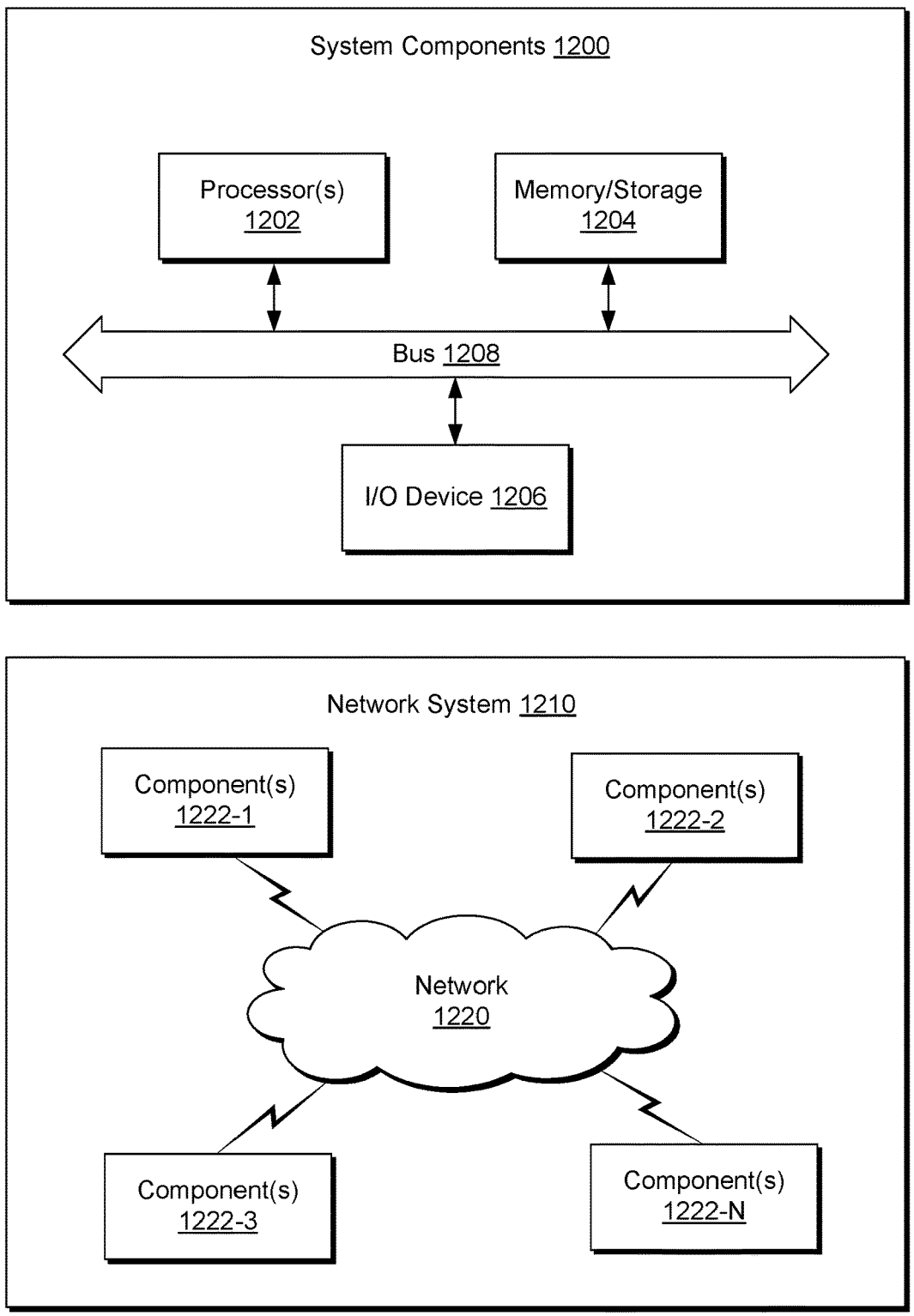
FIG. 12 illustrates example components of a system and a networked system.

FIG. 12 shows components of a computing system 1200 and a networked system 1210. The system 1200 includes one or more processors 1202, memory and/or storage components 1204, one or more input and/or output devices 1206 and a bus 1208. According to an embodiment, instructions may be stored in one or more computer-readable media (e.g., memory/storage components 1204). Such instructions may be read by one or more processors (e.g., the processor(s) 1202) via a communication bus (e.g., the bus 1208), which may be wired or wireless. The one or more processors may execute such instructions to implement (wholly or in part) one or more attributes (e.g., as part of a method). A user may view output from and interact with a process via an I/O device (e.g., the device 1206). According to an embodiment, a computer-readable medium may be a storage component such as a physical memory storage device, for example, a chip, a chip on a package, a memory card, etc. As an example, memory and/or storage components 1204 may store instructions of one or more methods such as, for example, the method 580, the method 680, the method 780, the method 880, the method 980, etc.

According to an embodiment, components may be distributed, such as in the network system 1210. The network system 1210 includes components 1222-1, 1222-2, 1222-3, . . . 1222-N. For example, the components 1222-1 may include the processor(s) 1202 while the component(s) 1222-3 may include memory accessible by the processor(s) 1202. Further, the component(s) 1222-2 may include an I/O device for display and optionally interaction with a method. The network may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically.

Although only a few examples have been described in detail above, those skilled in the art will readily appreciate that many modifications are possible in the examples. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A method, comprising:
    receiving a request from a requester for subsurface geophysical data of a geologic environment related to a drilling operation in the geologic environment;
    responsive to the request, authenticating the requester using a zero-knowledge authentication scheme; and
    responsive to authentication of the requester, providing access to at least a portion of the subsurface geophysical data of the geologic environment.

2. The method of claim 1, wherein the authenticating proves that the requester possesses a secret without revealing the secret.

3. The method of claim 1, wherein the request comprises an inherent challenge derived at least in part using a hash function and wherein the authenticating verifies the inherent challenge.

4. The method of claim 1, wherein the zero-knowledge authentication scheme is an interactive scheme.

5. The method of claim 1, wherein the zero-knowledge authentication scheme is a non-interactive scheme where a verifier used to authenticate the request does not send a challenge to the requester as part of the zero-knowledge authentication scheme.

6. The method of claim 1, wherein the subsurface geophysical data comprise seismic data, and providing access comprises providing access to a portion of the seismic data for a region of the geologic environment.

7. The method of claim 6, comprising:
    re-authenticating the requester via a subsequent challenge; and
    responsive to the re-authenticating, providing access to an additional portion of the seismic data for the region of the geologic environment, wherein the additional portion of the seismic data for the region comprises an increased resolution relative to a resolution of the portion of the seismic data for the region or the additional portion of the seismic data is for a different region of the geologic environment.

8. The method of claim 1, comprising iteratively providing access to portions of the subsurface geophysical data via a series of iterations, wherein each of the iterations depends on a corresponding authentication of the requester using the zero-knowledge authentication scheme.

9. The method of claim 1, comprising:
    analyzing the request for a geolocation of the requester and selecting the zero-knowledge authentication scheme based at least in part on the geolocation of the requester,
    analyzing the request for an operating system type of the requester or analyzing the request for a type of communication network utilized by the requester, and
    selecting the zero-knowledge authentication scheme based at least in part on the operating system type of the requester or based at least in part on the type of communication network.

10. The method of claim 1, wherein the subsurface geophysical data comprise authenticated subsurface geophysical data.

11. The method of claim 1, comprising receiving a zero-knowledge digital signature and responsive to authentication of the zero-knowledge digital signature, authenticating the subsurface geophysical data for storage.

12. The method of claim 1, comprising, responsive to the request, issuing a challenge to the requester, and, responsive to the challenge, receiving a response from the requester.

13. The method of claim 1, wherein the authenticating utilizes public knowledge to verify private knowledge of the requester without revealing the private knowledge of the requester, wherein the public knowledge comprises a public key and wherein the private knowledge comprises a private key.

14. A system comprising:
a processor;
memory accessible to the processor and storing non-transitory, processor-executable instructions executable by the processor to:
receive a request from a requester for subsurface geophysical data of a geologic environment related to a drilling operation in the geologic environment;
responsive to the request, authenticate the requester using a zero-knowledge authentication scheme; and
responsive to authentication of the requester, provide access to at least a portion of the subsurface geophysical data of the geologic environment.

15. The system of claim 14, wherein the non-transitory, processor-executable instructions stored in the memory are further executable by the processor to determine that the requester possesses a secret without revealing the secret.

16. The system of claim 14, wherein the non-transitory, processor-executable instructions stored in the memory are further executable by the processor to verify an inherent challenge within the request, the inherent challenge derived at least in part using a hash function.

17. The system of claim 14, wherein the zero-knowledge authentication scheme is an interactive scheme.

18. A computer program product comprising:
a non-transitory, computer readable medium storing processor-executable instructions that are configured to, upon execution by a processor:
receive a request from a requester for subsurface geophysical data of a geologic environment related to a drilling operation in the geologic environment;
responsive to the request, authenticate the requester using a zero-knowledge authentication scheme; and
responsive to authentication of the requester, provide access to at least a portion of the subsurface geophysical data of the geologic environment.

19. The computer program product of claim 18, wherein the non-transitory, processor-executable instructions stored in the memory are further executable by the processor to analyze the request for a geolocation of the requester and selecting the zero-knowledge authentication scheme based at least in part on the geolocation of the requester.

20. The computer program product of claim 18, wherein authenticating the requester comprises:
analyzing the request for at least one of an operating system type of the requester and a type of communication network utilized by the requester; and
selecting the zero-knowledge authentication scheme based at least in part on one of the operating system type of the requester and based at least in part on the type of communication network.

* * * * *